United States Patent
Kuroda et al.

(10) Patent No.: US 7,324,157 B2
(45) Date of Patent: Jan. 29, 2008

(54) REPEAT FIELD DETECTING APPARATUS, VIDEO PROGRESSIVE CONVERSION REPRODUCING APPARATUS, REPEAT FIELD DETECTING METHOD, PROGRAM, AND RECORDING MEDIUM

(75) Inventors: Keiichi Kuroda, Kyoto (JP); Tetsuya Itani, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 707 days.

(21) Appl. No.: 10/506,578

(22) PCT Filed: Nov. 11, 2003

(86) PCT No.: PCT/JP03/14294

§ 371 (c)(1),
(2), (4) Date: Sep. 2, 2004

(87) PCT Pub. No.: WO2004/045210

PCT Pub. Date: May 27, 2004

(65) Prior Publication Data

US 2005/0162547 A1    Jul. 28, 2005

(30) Foreign Application Priority Data

Nov. 12, 2002    (JP) .............................. 2002-328048

(51) Int. Cl.
H04N 11/20    (2006.01)
(52) U.S. Cl. ...................... 348/448; 348/441; 348/459; 348/700

(58) Field of Classification Search ................ 348/448, 348/441, 71, 570, 459, 554–558, 700–701, 348/401.1, 415.1, 97; 382/232, 236, 238, 382/248; H04N 11/20
See application file for complete search history.

(56) References Cited

U.S. PATENT DOCUMENTS

| | | | |
|---|---|---|---|
| 5,317,398 A * | 5/1994 | Casavant et al. | 348/570 |
| 5,617,136 A * | 4/1997 | Iso et al. | 348/71 |
| 6,525,774 B1 * | 2/2003 | Sugihara | 348/459 |
| 6,963,377 B2 * | 11/2005 | Del Corso | 348/558 |
| 2001/0026328 A1 | 10/2001 | Del Corson | |

FOREIGN PATENT DOCUMENTS

| | | |
|---|---|---|
| JP | 06-225208 | 8/1994 |
| JP | 06-233182 A | 8/1994 |

(Continued)

OTHER PUBLICATIONS

International Search Report for application No. PCT/JP03/14294 dated Mar. 23, 2004.

Primary Examiner—Trang U. Tran
(74) Attorney, Agent, or Firm—RatnerPrestia

(57) ABSTRACT

Using an index indicating the amount of motion and noise in the video image calculated on the basis of the discrepancy pixel numbers of image two fields ago and the present image, the reliability of detection result is obtained and utilized, so as to improve the repeat field detection accuracy and the scene change detection accuracy. Further, adaptive filter accuracy is improved by changing the determination conditions in the determination of the filter to be used. In addition, filter control accuracy is improved by suppressing the filter fluctuation per unit time.

22 Claims, 14 Drawing Sheets

FOREIGN PATENT DOCUMENTS

| | | |
|---|---|---|
| JP | 09-322126 A | 12/1997 |
| JP | 11-069227 A | 3/1999 |
| JP | 11-177935 A | 7/1999 |
| JP | 11-252515 A | 9/1999 |
| JP | 11-341444 A | 12/1999 |
| JP | 2000-188718 A | 7/2000 |
| JP | 2000-217084 A | 8/2000 |
| JP | 2001-169252 A | 6/2001 |
| JP | 2002-204433 A | 7/2002 |
| JP | 2003-508941 A | 3/2003 |
| WO | WO 01/10133 A1 | 2/2001 |
| WO | WO 01/65857 A1 | 9/2001 |

* cited by examiner

US 7,324,157 B2

REPEAT FIELD DETECTING APPARATUS, VIDEO PROGRESSIVE CONVERSION REPRODUCING APPARATUS, REPEAT FIELD DETECTING METHOD, PROGRAM, AND RECORDING MEDIUM

This application is a U.S. National Phase Application of PCT International Application PCT/JP2003/014294.

TECHNICAL FIELD

The present invention relates to: a progressive conversion reproducing apparatus of converting an inputted interlace video signal into a progressive video signal; a repeat field detecting apparatus used in this progressive conversion reproducing apparatus so as to detect a repeat field; a repeat field detecting method; a program; and a recording medium.

BACKGROUND ART

FIG. 14 shows the configuration of a prior art progressive conversion reproducing apparatus. Numeral 301 indicates a video signal inputting apparatus of receiving an NTSC video signal from an external system and then converting the signal into digital data capable of being stored in a field buffer. Numeral 302 indicates a field buffer of accumulating two fields of the digital data converted by the apparatus 301. Numeral 303 indicates a pixel information comparing apparatus of comparing on a pixel basis the data delayed by two fields in the apparatus 302 with the data of the present field converted and outputted from the apparatus 301. Numeral 304 indicates a discrepancy pixel number counting apparatus of counting on a field basis the number of the pixels determined as discrepancy by the apparatus 303. Numeral 305 indicates a video filter apparatus which performs a filtering process appropriate for a video image onto the data delayed by two fields in the apparatus 302 and onto the data of the present field converted and outputted from the apparatus 301, and which combines the data and then outputs the result. Numeral 306 indicates a motion picture filter apparatus which performs a filtering process appropriate for motion picture material onto the data delayed by two fields in the apparatus 302 and onto the data of the present field converted and outputted from the apparatus 301, and which combines the data and then outputs the result. Numeral 307 indicates a still image filter apparatus which performs a filtering process appropriate for a still image onto the data delayed by two fields in the apparatus 302 and onto the data of the present field converted and outputted from the apparatus 301, and which combines the data and then outputs the result. Numeral 308 indicates a filter switching apparatus of outputting a filter output result selected from the outputs of the apparatuses 305, 306, and 307. Numeral 309 indicates a progressive video buffer of accumulating the progressive video data selected and outputted from the apparatus 308. Numeral 310 indicates a progressive video outputting apparatus of converting the progressive video data accumulated in the apparatus 309 into the form of a progressive video signal, and of outputting the signal. Numeral 311 indicates an output terminal of outputting the output signal from the apparatus 310 to an external system. Numeral 357 indicates a first repeat field detecting apparatus of comparing the discrepancy pixel number obtained as the output result of the apparatus 304 with a threshold value which is a predetermined absolute value, and of detecting that the field is a repeat field if the discrepancy pixel number is smaller than or equal to the threshold value. Numeral 326 indicates a material determining apparatus of recording a repeat field history which is the history of the detection results of the apparatus 357, and of determining on the basis of the recorded repeat field history whether the above-mentioned video input signal is video-recorded material, material having been 3-2-pulled down from a motion picture, or material obtained from a still image. Numeral 321 indicates an elapsed field counting apparatus of counting, on the basis of the repeat field detection result outputted from the apparatus 357, elapsed fields (the number of) which indicates how many fields have elapsed in the above-mentioned video input signal counted from the repeat field. Numeral 358 indicates a progressive conversion controlling apparatus of controlling the apparatus 308 on the basis of the material determination result from the apparatus 326 and in some cases on the basis of the above-mentioned elapsed fields obtained from the apparatus 321, so as to select a filter appropriate to the input video signal. Numeral 322 indicates an apparatus of controlling the apparatus 309 on the basis of the above-mentioned elapsed fields obtained from the apparatus 321, so as to controlling a timing signal of updating the above-mentioned progressive video buffer provided in the apparatus 309 with the progressive video data selected and outputted from the apparatus 308. These apparatuses constitute a progressive conversion reproducing apparatus.

In such a progressive conversion reproducing apparatus, in many cases, solely the detection of a repeat field serves as a condition of controlling the timing of the filtering process and the combining of the output video images. Accordingly, false detection of a repeat field can cause false conversion such as the use of an inappropriate filter and the combining of video images that are intrinsically not to be combined to each other. Thus, important is the detection accuracy for the repeat field. Nevertheless, in the prior art system, when comparison result between the signal two fields ago and the signal of the present field in the inputted video signal is smaller than or equal to a predetermined absolute value, the field is determined as a repeat field. Accordingly, in a scene having little motion such as the case that motion occurs merely in a part of the image, the number of discrepancy pixels decreases, and hence a problem occurs that even a field which is intrinsically not a repeat field is determined as if a repeat field.

Further, when the video quality of video material generated by the 3-2-pulling down of motion picture material is degraded, that is, when noise is introduced into the video image, the difference in the video images due to the noise causes an increase in the number of discrepancy pixels. In another example, when a three-dimensional noise reduction process is carried out for calculating the difference between the preceding and the following fields so as to reduce the noise, discrepancy decreases in successive fields. Nevertheless, in this case, the number of discrepancy pixels compared with the signal two fields ago in a repeat field where the pixels should intrinsically agree with the former ones is calculated from the video images generated by combining frames which are located before and after the frame of the comparison reference and which intrinsically have different images. This can cause a discrepancy in the images by the amount equal to the change in the images before and after the repeat field, and hence can increase the number of discrepancy pixels. When this increase exceeds the threshold value for the repeat field detection, a problem occurs that even a repeat field is determined as if an ordinary field. In such cases described here that the repeat field detection is not accurately achieved, the repeat field information inputted to the apparatus 326 cannot reflect appropriately the feature of the interlace video image inputted to the apparatus 301, so that the material determination can fail and that material determination and filter control can be difficult to be carried out accurately in the video progressive conversion. This can cause frequent switching of filters and inappropriate selection of a filter. Further, a video image composed in an inappropriate timing can be accumulated in the progressive video buffer and then outputted as a video image. These cause a problem of degradation in the quality of the output video image. See, for example, JP-A-2000-188718. The entire disclosure of JP-A-2000-188718 is incorporated herein by reference in its entirety.

Such a video progressive conversion reproducing apparatus requires accurate material determination and filter control. Nevertheless, in the first repeat field detecting means of the apparatus 357, in a scene having little motion, the number of discrepancy pixels becomes smaller than a predetermined threshold value even in a scene other than repeat fields, and hence repeat fields cannot be identified accurately. Further, in case of degradation in the quality of the video material or in case of the use of three-dimensional noise reduction, video information does not completely agree even in a repeat field where the information should intrinsically agree with the former one. This causes a problem that the number of discrepancy pixels exceeds the predetermined threshold value in the apparatus 357, and that accordingly repeat fields cannot be detected even in video material generated by the 3-2-pulling down of motion picture material. In such cases described here that the repeat field detection is not accurately achieved, material determination and filter control become difficult to be carried out accurately in the video progressive conversion. This can cause frequent switching of filters and inappropriate selection of a filter. These cause a problem of degradation in the quality of the output video image.

That is, there is a problem that errors occur in the detection of repeat fields in case of a scene having little motion, in case of degradation in the quality of video material, in case that noise on the time axis is introduced owing to the use of three-dimensional noise reduction, or in case that the video is recorded in irregular patterns.

DISCLOSURE OF THE INVENTION

With considering the above-mentioned problem, an object of the invention is to provide: a video progressive conversion reproducing apparatus of performing repeat field detection as accurately as possible so as to perform material determination and filter control as accurately as possible even in case of a scene having little motion, in case of degradation in the quality of video material, in case that noise on the time axis is introduced owing to the use of three-dimensional noise reduction, or in case that the video is recorded in irregular patterns; a repeat field detecting apparatus; a repeat field detecting method; a program; and a recording medium.

The first aspect of the present invention is a repeat field detecting apparatus which is used in a video progressive conversion reproducing apparatus of converting a video input signal of interlace scheme into a video signal of progressive scheme and which detects whether said video input signal is a repeat field where the same video image is outputted repeatedly or an ordinary field which is other than said repeat field, said repeat field detecting apparatus comprising:

RF determining means of identifying a repeat field having a predetermined distance from said video input signal, on the basis of a discrepancy pixel number which is the number of the pixels having discrepancy between the pixel information of a field of said video input signal and the pixel information of a field of said video input signal having a predetermined distance from the former-mentioned field of the video input signal;

M/N ratio calculating means of obtaining an N component which is the number of discrepancy pixels between said repeat fields and an M component which is the number of discrepancy pixels between at least a pair of fields which are other than said repeat fields and have said predetermined distance from each other, and then calculating an M/N ratio which is the ratio of said M component to said N component;

RF determination reliability calculating means of outputting the reliability of the determination result of said first RF determining means on the basis of the output of said M/N ratio calculating means; and M/N ratio adaptive repeat field confirming means of confirming the output of said first RF determining means as the determination result on the basis of said reliability outputted from said RF determination reliability calculating means.

The probability of performing false progressive conversion is reduced, so as to improve the image quality of the output video image processed by video progressive conversion.

The second aspect of the present invention is a repeat field detecting apparatus according to the first aspect of the present invention, wherein said predetermined distance is a distance having one field therebetween, and wherein said at least a pair of fields are pairs of four adjacent fields.

The third aspect of the present invention is a repeat field detecting apparatus according to the first aspect of the present invention, wherein said at least a pair is two pairs or more, and wherein said M component is the average between the discrepancy pixel numbers of said two pairs or more of fields.

The fourth aspect of the present invention is a repeat field detecting apparatus according to the first aspect of the present invention, wherein said M/N ratio adaptive repeat field confirming means determines the field as an ordinary field until five fields have elapsed from the initial state, and wherein after five or more fields have elapsed from the initial state, said M/N ratio adaptive repeat field confirming means determines the field as an ordinary field when the output of said RF determination reliability calculating means is smaller than a predetermined threshold value, and sets the output of said first RF determining means as the determination result when the output of said RF determination reliability calculating means is greater than or equal to said predetermined threshold value.

An M/N ratio is calculated and used as an index indicating the reliability of the repeat field detection. When the M/N ratio is smaller than or equal to a predetermined threshold value, the repeat field determination result is not reliable, and hence the field is treated as an ordinary field. That is, when the possibility of being a repeat field is small, a filtering process for ordinary fields is performed, so that the probability of performing false progressive conversion is reduced. This improves the image quality of the output video image processed by video progressive conversion.

The fifth aspect of the present invention is a repeat field detecting apparatus according to the first aspect of the present invention, wherein said M/N ratio calculating means comprises:

discrepancy pixel history means of storing the history of said discrepancy pixel numbers for the past five fields including the present value at each time when said video input signal advances by one field;

N component detecting means of setting the minimum value among the values stored in said discrepancy pixel history means as an N component indicating the amount of the noise component on the time axis of the input video signal, at each time when said video input signal advances by one field;

M component detecting means of subtracting the value detected by said N component detecting means from the sum of all the five values stored in said discrepancy pixel history means, then dividing the value by four, and then setting this result as an M component indicating the motion component on the time axis of the video signal, at each time when said video input signal advances by one field; and calculating means of calculating an M/N ratio which is the ratio of said M component to said N component.

The calculation of the M/N ratio is performed at the shortest period of the latest five fields. This permits the M/N ratio to be calculated in a manner capable of following rapidly the change in the video image. This reduces the delay in the determination result and shortens the duration in which false progressive conversion is performed. This reduces the probability of performing the false progressive conversion, so as to improve the image quality of the output video image processed by video progressive conversion.

The sixth aspect of the present invention is a repeat field detecting apparatus according to the first aspect of the present invention, wherein said RF determination reliability calculating means returns a value indicating the reliability of said first RF determining means corresponding to the output value of said M/N ratio calculating means, on the basis of previously-obtained information indicating the relation between the reliability of said first RE determining means and the output of said M/N ratio calculating means and on the basis of the output provided from said M/N ratio calculating means.

The relation between the M/N ratio obtained from the video input signal and the reliability of the incorporated RF determining means is measured in advance. Then, on the basis of the M/N ratio of the video input signal to be processed by video progressive conversion, an index indicating the reliability of the output of the RF determining means at the time of conversion is obtained and used. This improves repeat field detection accuracy, and hence reduces the probability of performing the false progressive conversion, so as to improve the image quality of the output video image processed by video progressive conversion.

The seventh aspect of the present invention is a repeat field detecting apparatus according to the first aspect of the present invention, wherein said first RF determining means comprises:

period position identifying means of being initialized by an initialization input, then being incremented by one at each time when said discrepancy pixel number is received in association with the elapse of one field, and then returning to the initial value after the elapse of five fields, so as to output a period position;

initial period checking means of outputting whether said period position identifying means has advanced by one or more periods or not;

first through fifth accumulated averaging means of calculating the average of said discrepancy pixel numbers when said period position identifying means indicates the n-th field (n=1 through 5), so that the average is stored into the n-th accumulated averaging means; and determining means of determining the field as a repeat field when the output value selected from the output values of said first through fifth accumulated averaging means in correspondence to the output value of said period position identifying means is the minimum one among the output values of said first through fifth accumulated averaging means, and otherwise determining the field as an ordinary field.

The discrepancy pixel numbers are averaged out at the same period position n (n=1 through 5). As a result, in a period position corresponding to a repeat field, the discrepancy pixel number stays always small. In other period positions, depending on the difference in the input video signal, the discrepancy pixel number becomes large in a scene having large motion, and becomes small in a scene having little motion, so as to be averaged out. Thus, the n-th discrepancy pixel number not located at the repeat field position has an averaged value larger than the discrepancy pixel number. This makes clear the difference between the discrepancy pixel numbers even in a scene having little motion, and hence permits easy identification of the position of the repeat field. This improves the repeat field detection accuracy, and hence reduces the probability of performing false progressive conversion, so as to improve the image quality.

The eighth aspect of the present invention is a repeat field detecting apparatus according to the seventh aspect of the present invention, comprising scene change detecting means of determining the presence or absence of a scene change in said video input signal on the basis of said discrepancy pixel number, wherein said initialization input is an input provided from said scene change detecting means when the output of said scene change detecting means indicates a scene change, and wherein said n-th accumulated averaging means stores said discrepancy pixel number when said initial period checking means is in the initial state and when said period position identifying means indicates the n-th field, and stores the average between said discrepancy pixel number and the value stored in said n-th accumulated averaging means when said initial period checking means is in a state other than the initial state and when said period position identifying means indicates the n-th field, and further resets said period position identifying means and said initial period checking means when the output of said scene change detecting means indicates a scene change.

The first through n-th accumulated averaging means are initialized at each time when a scene change is detected. This permits such correction that the positional deviation of a repeat field which can occur at a scene change which is an editing point of the video input signal is prevented from mixing into the first through fifth accumulated averaging means. This reduces the probability of occurrence of false determination which occurs when the repeat field position changes at the editing point. This permits accurate identification of the repeat field position, and hence reduces the probability of performing false progressive conversion, so as to improve the image quality.

The ninth aspect of the present invention is a repeat field detecting apparatus which is used in a video progressive conversion reproducing apparatus of converting a video input signal of interlace scheme into a video signal of progressive scheme and which detects whether said video input signal is a repeat field where the same video image is outputted repeatedly or an ordinary field which is other than said repeat field, said repeat field detecting apparatus comprising:

long term M/N ratio calculating means of obtaining an N component which is the number of discrepancy pixels between said repeat fields and an M component which is the number of discrepancy pixels between at least a pair of fields which are other than said repeat fields and have said predetermined distance from each other, on the basis of a discrepancy pixel number which is the number of the pixels having discrepancy between the pixel information of a field of said video input signal and the pixel information of a field of said video input signal having a predetermined distance from the former-mentioned field of the video input signal and on the basis of information of a scene change, and then calculating a long term M/N ratio which is the ratio of said M component to said N component on the time axis of said video input signal ranging from the scene change to the present;

M/N ratio adaptive scene change detecting means of determining the presence or absence of a scene change in said video input signal on the basis of said discrepancy pixel number and the output of said long term M/N ratio calculating means;

M/N ratio adaptive composite RF determining means of detecting a repeat field on the basis of said discrepancy pixel number and the output of said M/N ratio adaptive scene change detecting means;

RF determination reliability calculating means of outputting the reliability of said M/N ratio adaptive composite RF determining means on the basis of the output of said long term M/N ratio calculating means; and M/N ratio adaptive repeat field confirming means of confirming the output of said first RF determining means as the determination result on the basis of said reliability outputted from said RF determination reliability calculating means; and wherein said information of a scene change is the determination result of said M/N ratio adaptive scene change detecting means.

The repeat field detecting means used is M/N ratio adaptive composite RF determining means. This improves the repeat field detection accuracy. Further, the long term M/N ratio indicating the motion and the noise characteristics in each scene of the input video signal is calculated and used as an index for scene change detection and as an index for repeat field determination result. This avoids that the field is determined as if an ordinary field on the basis of a temporary decrease in the motion. Accordingly, this reduces the probability of performing false progressive conversion, so as to improve the image quality.

The tenth aspect of the present invention is a repeat field detecting apparatus according to the ninth aspect of the present invention, wherein said predetermined distance is a distance having one field therebetween, and wherein said at least a pair of fields are one or more pairs of fields among four pairs of fields which adjoin the arbitrary pair of fields which measure a M/N ratio.

The eleventh aspect of the present invention is a repeat field detecting apparatus according to the ninth aspect of the present invention, wherein said at least a pair is two pairs or more, and wherein said M component is the average between the discrepancy pixel numbers of said two pairs or more of fields.

The twelfth aspect of the present invention is a repeat field detecting apparatus according to the ninth aspect of the present invention, wherein said M/N ratio adaptive composite RF determining means comprises:

a first RF determining means according to Present Invention 7;

a second RF determining means of comparing said discrepancy pixel number with a second RF determination threshold value which is a predetermined value, then detecting that the field is a repeat field if said discrepancy pixel number is smaller than said second RF determination threshold value, and detecting that the field is an ordinary field if said discrepancy pixel number is greater than said second RF determination threshold value;

discrepancy pixel storing means of storing said discrepancy pixel number and then outputting said discrepancy pixel number with a delay of one field;

a third RF determining means of comparing the output of said discrepancy pixel storing means with said discrepancy pixel number, then detecting that the field is a repeat field if said discrepancy pixel number is smaller than or equal to the output of said discrepancy pixel storing means, and detecting that the field is an ordinary field if said discrepancy pixel number is greater than the output of said discrepancy pixel storing means;

M/N ratio calculating means of calculating an M/N ratio which is the ratio of the motion component to the noise component on the time axis of said video input signal, from said discrepancy pixel number;

a fourth RF determining means of selecting a threshold value obtained in advance for the purpose of repeat field detection in correspondence to an M/N ratio based on the output of said M/N ratio calculating means, then comparing said discrepancy pixel number with a fourth RF determination threshold value generated by adding the inputted N component to said selected threshold value, then detecting that the field is a repeat field if said discrepancy pixel number is smaller than said fourth RF determination threshold value, and detecting that the field is an ordinary field if said discrepancy pixel number is greater than said fourth RF determination threshold value;

m-th M/N ratio adaptive RF determination value means of returning the reliability of said m-th (m=1 through 4) RF determining means on the basis of the output of said M/N ratio calculating means; and adding means of adding the output of said m-th M/N ratio adaptive RF determination value means, then comparing this result with an M/N ratio adaptive composite RF determination threshold value which is a predetermined value, then determining the field as a repeat field when said result is greater than said threshold value, and determining the field as an ordinary field when said result is smaller than said threshold value.

The first through fourth repeat field means are used each having different determination characteristics. These means are: prior art means of calculating the repeat field on the basis of the comparison between a fixed value and the discrepancy pixel number; prior art means of calculating the repeat field on the basis of the comparison with the preceding discrepancy pixel number; new means of calculating the repeat field by using the first through fifth accumulated averaging means; and new means of calculating the repeat field on the basis of an M/N-ratio dependent threshold value and the discrepancy pixel number, so as to improve the repeat field detection accuracy. In addition to the results of these means, used is the reliability obtained from the M/N ratio. This permits more reliable repeat field determination result, and hence reduces the probability of performing false progressive conversion, so as to improve the image quality.

The thirteenth aspect of the present invention is a repeat field detecting apparatus according to the twelfth aspect of the present invention, wherein said m-th (m=1 through 4) M/N ratio adaptive RF determination value means outputs a value which is a predetermined and recorded value corresponding to the output of the M/N ratio calculating means and indicating the reliability of the m-th RF determining means, and which is positive for a repeat field and is negative for an ordinary field, and further the absolute value of which indicates the reliability, wherein a large value indicates high reliability, while a small value indicates low reliability.

The repeat field detection accuracy is improved, and hence reduces the probability of performing false progressive conversion, so as to improve the image quality of the output video image processed by video progressive conversion.

The fourteenth aspect of the present invention is a repeat field detecting apparatus according to the ninth aspect of the present invention, wherein said long term M/N ratio calculating means comprises:

period position identifying means of being initialized by an initialization input, then being incremented by one at each time when said discrepancy pixel number is received in association with the elapse of one field, and then returning to the initial value after the elapse of n fields (n=1 through 5), so as to output a period position;

initial period checking means of outputting whether said period position identifying means has advanced by one or more periods or not;

first through fifth accumulated averaging means of calculating the average of said discrepancy pixel numbers when said period position identifying means indicates the n-th field, so that the average is stored into the n-th accumulated averaging means;

long term N component means of setting the minimum value among the output values of said first through n-th accumulated averaging means as a long term N component indicating the amount of the noise component on the time axis of the input video signal, on the basis of said n-th accumulated averaging means at each time when said video input signal advances by one field;

long term M component means of subtracting the value of said long term N component means from the sum of all the output values of said first through n-th accumulated averaging means, then-dividing the value by n−1, and then setting this result as a long term M component indicating the motion component on the time axis of the video signal, at each time when said video input signal advances by one field; and calculating means of calculating a long term M/N ratio which is the ratio of said long term M component to said long term N component.

The long term M/N ratio which is an M/N ratio in a long term between a scene change and another scene change is calculated and used. Without this invention, the detection of temporary image degradation reduces the M/N ratio even when a repeat field is in continuation and even when the repeat field position does not vary. This causes the repeat field to be detected as if an ordinary field. However, this invention reduces the probability of such false determination, and hence reduces the probability of performing false progressive conversion, so as to improve the image quality of the output video image processed by video progressive conversion.

The fifteenth aspect of the present invention is a repeat field detecting apparatus according to the fourteenth aspect of the present invention, wherein said M/N ratio adaptive scene change detecting means compares the absolute value of the difference between said discrepancy pixel number and said long term M component with said M/N-ratio dependent threshold value, then determines the scene as a continuous scene when said absolute value is smaller than the threshold value, and determines the scene as a scene change when said absolute value is greater than or equal to the threshold value.

The threshold value for scene change determination is varied depending on the long term M component and the long term M/N ratio, so as to improve the scene change detection accuracy. Without this invention, the detection of temporary image degradation reduces the threshold value for scene change determination even when the scene is in continuation. This causes the continuous scene to be determined as if a scene change. Thus, in the following processes, the field is determined as if an ordinary field, and hence false progressive conversion is performed. However, this invention reduces the probability of the occurrence of the problem of performing such false progressive conversion, so as to improve the image quality.

The sixteenth aspect of the present invention is a video progressive conversion reproducing apparatus comprising:

a repeat field detecting apparatus according to the eighth aspect of the present invention;

motion picture material continuation period identifying means of being incremented by one when said video input signal is motion picture material, and being cleared into zero for video material, and further being cleared into zero also when said scene change detecting means or said M/N ratio adaptive scene change detecting means outputs a determination indicating a scene change, so as to count the periods where the motion picture determination is in continuation;

motion picture composition filter selection threshold value calculating means of calculating a threshold value varying depending on the output of said M/N ratio calculating means; and M/N ratio adaptive progressive conversion controlling means of comparing the output of said motion picture composition filter selection threshold value calculating means with said motion picture material continuation period, then performing an output such as to set a filter appropriate for motion picture material if the former-mentioned output is greater than said motion picture composition filter selection threshold, and performing an output such as to set a filter appropriate for a still image if said output is smaller than said motion picture composition filter selection threshold and if said material determining means determines the field as a still image, and otherwise performing an output such as to set a filter appropriate for video material.

The threshold value for the detection duration for the determination that a motion picture composition filter is to be set is varied depending on the M/N ratio. That is, when the repeat field determination has high reliability, the motion picture composition filter is set after a short time. In contrast, when the repeat field determination has low reliability, the motion picture composition filter is set after the determination as motion picture material continues for a long time. This improves both the follow of filter switching and the reliability of accurate filter setting, so as to improve the image quality.

The seventeenth aspect of the present invention is a video progressive conversion reproducing apparatus comprising:

a repeat field detecting apparatus according to the fifteenth aspect of the present invention;

motion picture material continuation period identifying means of being incremented by one when said video input signal is motion picture material, and being cleared into zero for video material, and further being cleared into zero also when said scene change detecting means or said M/N ratio adaptive scene change detecting means outputs a determination indicating a scene change, so as to count the periods where the motion picture determination is in continuation;

motion picture composition filter selection threshold value calculating means of calculating a threshold value varying depending on the output of said long term M/N ratio calculating means; and M/N ratio adaptive progressive conversion controlling means of comparing the output of said motion picture composition filter selection threshold value calculating means with said motion picture material continuation period, then performing an output such as to set a filter appropriate for motion picture material if the former-mentioned output is greater than said motion picture composition filter selection threshold, and performing an output such as to set a filter appropriate for a still image if said output is smaller than said motion picture composition filter selection threshold and if said material determining means determines the field as a still image, and otherwise performing an output such as to set a filter appropriate for video material.

The threshold value for the detection duration for the determination that a motion picture composition filter is to be set is varied depending on the long term M/N ratio. That is, when the repeat field determination has high reliability, the motion picture composition filter is set after a short time. In contrast, when the repeat field determination has low reliability, the motion picture composition filter is set after the determination as motion picture material continues for a long time. This improves both the follow of filter switching and the reliability of accurate filter setting, so as to improve the image quality.

The eighteenth aspect of the present invention is a video progressive conversion reproducing apparatus according to the sixteenth or seventeenth aspect of the present invention, comprising:

filter change history means of recording as a history the information whether the filter setting has been changed in said M/N ratio adaptive progressive conversion controlling means or not;

filter change frequency detecting means of being incremented by one when the filter setting is changed in said M/N ratio adaptive progressive conversion controlling means, and being decremented by one when the filter change information delayed by d fields in said filter change history means indicates a filter change, so as to detect the filter change frequency in the past d fields; and irregular pattern countermeasure controlling means of comparing with a filter variation allowable limit frequency indicating the allowable limit for filter variation, and then, if said filter change frequency is greater than the allowable limit, causing said filter selecting means to select video filter means and changing said d value and said filter variation allowable limit so as to adjust the sensitivity.

An effect is provided that when an irregular video input signal is obtained such that the material determination result varies continuously, continuous filter variation is suppressed, so that the image quality is improved. Further, the filter variation allowable limit and the depth d of filter change history can be changed, so that the sensitivity can be adjusted.

The nineteenth aspect of the present invention is a repeat field detecting method which is used in a video progressive conversion reproducing apparatus of converting a video input signal of interlace scheme into a video signal of progressive scheme and which detects whether said video input signal is a repeat field where the same video image is outputted repeatedly or an ordinary field which is other than said repeat field, said repeat field detecting method comprising:

an RF determining step of identifying a repeat field having a predetermined distance from said video input signal, on the basis of a discrepancy pixel number which is the number of the pixels having discrepancy between the pixel information of a field of said video input signal and the pixel information of a field of said video input signal having a predetermined distance from the former-mentioned field of the video input signal;

an M/N ratio calculating step of obtaining an N component which is the number of discrepancy pixels between said repeat fields and an M component which is the number of discrepancy pixels between at least a pair of fields which are other than said repeat fields and have said predetermined distance from each other, and then calculating an M/N ratio which is the ratio of said M component to said N component;

an RF determination reliability calculating step of outputting the reliability of the determination result of said first RF determining step on the basis of the output of said M/N ratio calculating step; and an M/N ratio adaptive repeat field confirming step of confirming the output of said first RF determining step as the determination result on the basis of said reliability outputted from said RF determination reliability calculating step.

The twentieth aspect of the present invention is a repeat field detecting method which is used in a video progressive conversion reproducing apparatus of converting a video input signal of interlace scheme into a video signal of progressive scheme and which detects whether said video input signal is a repeat field where the same video image is outputted repeatedly or an ordinary field which is other than said repeat field, said repeat field detecting method comprising:

a long term M/N ratio calculating step of obtaining an N component which is the number of discrepancy pixels between said repeat fields and an M component which is the number of discrepancy pixels between at least a pair of fields which are other than said repeat fields and have said predetermined distance from each other, on the basis of a discrepancy pixel number which is the number of the pixels having discrepancy between the pixel information of a field of said video input signal and the pixel information of a field of said video input signal having a predetermined distance from the former-mentioned field of the video input signal and on the basis of information of a scene change, and then calculating a long term M/N ratio which is the ratio of said M component to said N component on the time axis of said video input signal ranging from the scene change to the present;

an M/N ratio adaptive scene change detecting step of determining the presence or absence of a scene change in said video input signal on the basis of said discrepancy pixel number and the output of said long term M/N ratio calculating step;

an M/N ratio adaptive composite RF determining step of detecting a repeat field on the basis of said discrepancy pixel number and the output of said M/N ratio adaptive scene change detecting step;

an RF determination reliability calculating step of outputting the reliability of said M/N ratio adaptive composite RF determining step on the basis of the output of said long term M/N ratio calculating step; and an M/N ratio adaptive repeat field confirming step of confirming the output of said first RF determining step as the determination result on the basis of said reliability outputted from said RF determination reliability calculating step; and wherein said information of a scene change is the determination result of said M/N ratio adaptive scene change detecting step.

The twenty-first aspect of the present invention is a program of causing a computer to serve as:

RF determining means of identifying a repeat field having a predetermined distance from said video input signal, on the basis of a discrepancy pixel number which is the number of the pixels having discrepancy between the pixel information of a field of said video input signal and the pixel information of a field of said video input signal having a predetermined distance from the former-mentioned field of the video input signal;

M/N ratio calculating means of obtaining an N component which is the number of discrepancy pixels between said repeat fields and an M component which is the number of discrepancy pixels between at least a pair of fields which are other than said repeat fields and have said predetermined distance from each other, and then calculating an M/N ratio which is the ratio of said M component to said N component;

RF determination reliability calculating means of outputting the reliability of the determination result of said first RF determining means on the basis of the output of said M/N ratio calculating means; and M/N ratio adaptive repeat field confirming means of confirming the output of said first RF determining means as the determination result on the basis of said reliability outputted from said RF determination reliability calculating means; in a repeat field detecting apparatus according to the first aspect of the present invention.

The twenty-second aspect of the present invention is a program of causing a computer to serve as:

long term M/N ratio calculating means of obtaining an N component which is the number of discrepancy pixels between said repeat fields and an M component which is the number of discrepancy pixels between at least a pair of fields which are other than said repeat fields and have said predetermined distance from each other, on the basis of a discrepancy pixel number which is the number of the pixels having discrepancy between the pixel information of a field of said video input signal and the pixel information of a field of said video input signal having a predetermined distance from the former-mentioned field of the video input signal and on the basis of information of a scene change, and then calculating a long term M/N ratio which is the ratio of said M component to said N component on the time axis of said video input signal ranging from the scene change to the present;

M/N ratio adaptive scene change detecting means of determining the presence or absence of a scene change in said video input signal on the basis of said discrepancy pixel number and the output of said long term M/N ratio calculating means;

M/N ratio adaptive composite RF determining means of detecting a repeat field on the basis of said discrepancy pixel number and the output of said M/N ratio adaptive scene change detecting means;

RF determination reliability calculating means of outputting the reliability of said M/N ratio adaptive composite RF determining means on the basis of the output of said long term M/N ratio calculating means; and M/N ratio adaptive repeat field confirming means of confirming the output of said first RF determining means as the determination result on the basis of said reliability outputted from said RF determination reliability calculating means; in a repeat field detecting apparatus according to the ninth aspect of the present invention.

The twenty-third aspect of the present invention is a computer-processable recording medium carrying a program according to the twenty-first or twenty-second aspect of the present invention.

DESCRIPTION OF THE REFERENCE NUMERALS

Figure 1:
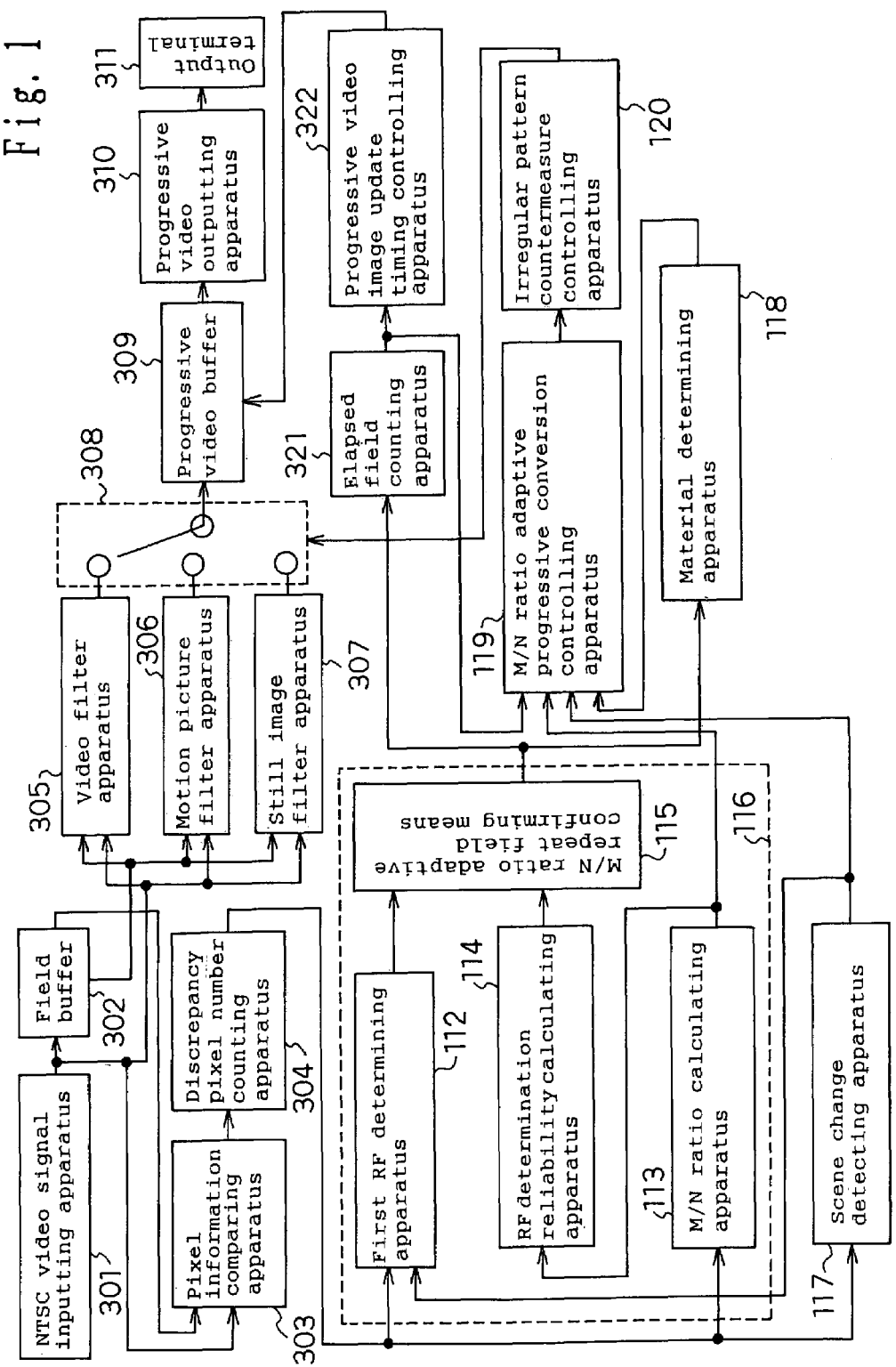
FIG. 1 is a block diagram showing a video progressive conversion reproducing apparatus according to Embodiment 1 of the invention.

| | |
|---|---|
| 301 | NTSC video signal inputting apparatus |
| 302 | Field buffer |
| 303 | Pixel information comparing apparatus |
| 304 | Discrepancy pixel number counting apparatus |
| 305 | Video filter apparatus |

-continued

| | |
|---|---|
| 306 | Motion picture filter apparatus |
| 307 | Still image filter apparatus |
| 308 | Filter switching apparatus |
| 309 | Progressive video buffer |
| 310 | Progressive video outputting apparatus |
| 311 | Output terminal |
| 112 | First RF determining apparatus |
| 113, 235 | M/N ratio calculating apparatus |
| 114, 214 | RF determination reliability calculating apparatus |
| 115, 215 | M/N ratio adaptive repeat field confirming means |
| 116, 216 | Repeat field detecting means block |
| 117 | Scene change detecting apparatus |
| 118 | Material determining apparatus |
| 119 | M/N ratio adaptive progressive conversion controlling apparatus |
| 120 | Irregular pattern countermeasure controlling apparatus |
| 321 | Elapsed field counting apparatus |
| 322 | Progressive video image update timing controlling apparatus |
| 123 | Discrepancy pixel number input |
| 124 | Scene change detection result input |
| 125 | Period position identifying apparatus |
| 126 | Initial period checking apparatus |
| 127 | Discrepancy pixel number accumulation destination switching apparatus |
| 128 | First accumulated averaging apparatus |
| 129 | Second accumulated averaging apparatus |
| 130 | Third accumulated averaging apparatus |
| 131 | Fourth accumulated averaging apparatus |
| 132 | Fifth accumulated averaging apparatus |
| 133 | RF determining apparatus by means of the minimum value of accumulated average |
| 134 | First through fifth accumulated average calculating apparatus |
| 224 | Long term M/N ratio calculating apparatus |
| 225 | M/N ratio adaptive scene change detecting apparatus |
| 236 | First RF determining apparatus |
| 237 | Second RF determining apparatus |

238 Third RF determining apparatus
239 Fourth RF determining apparatus
240 First M/N ratio adaptive RF determination value means apparatus
241 Second M/N ratio adaptive RF determination value means apparatus
242 Third M/N ratio adaptive RF determination value means apparatus
243 Fourth M/N ratio adaptive RF determination value means apparatus
244, 255 Adder
245 M/N ratio adaptive composite repeat field detection threshold value
246, 249, 251, 256 Comparator
247 M/N ratio adaptive composite RF determining means
248 Repeat field determination threshold value
250 Previous discrepancy pixel storing means
252 N component input
253 M/N ratio input
254 M/N ratio adaptive repeat field determination threshold value calculating apparatus

MODE FOR CARRYING OUT THE INVENTION

Embodiments of the invention are described below with reference to the drawings.

Embodiment 1

Figure 14:
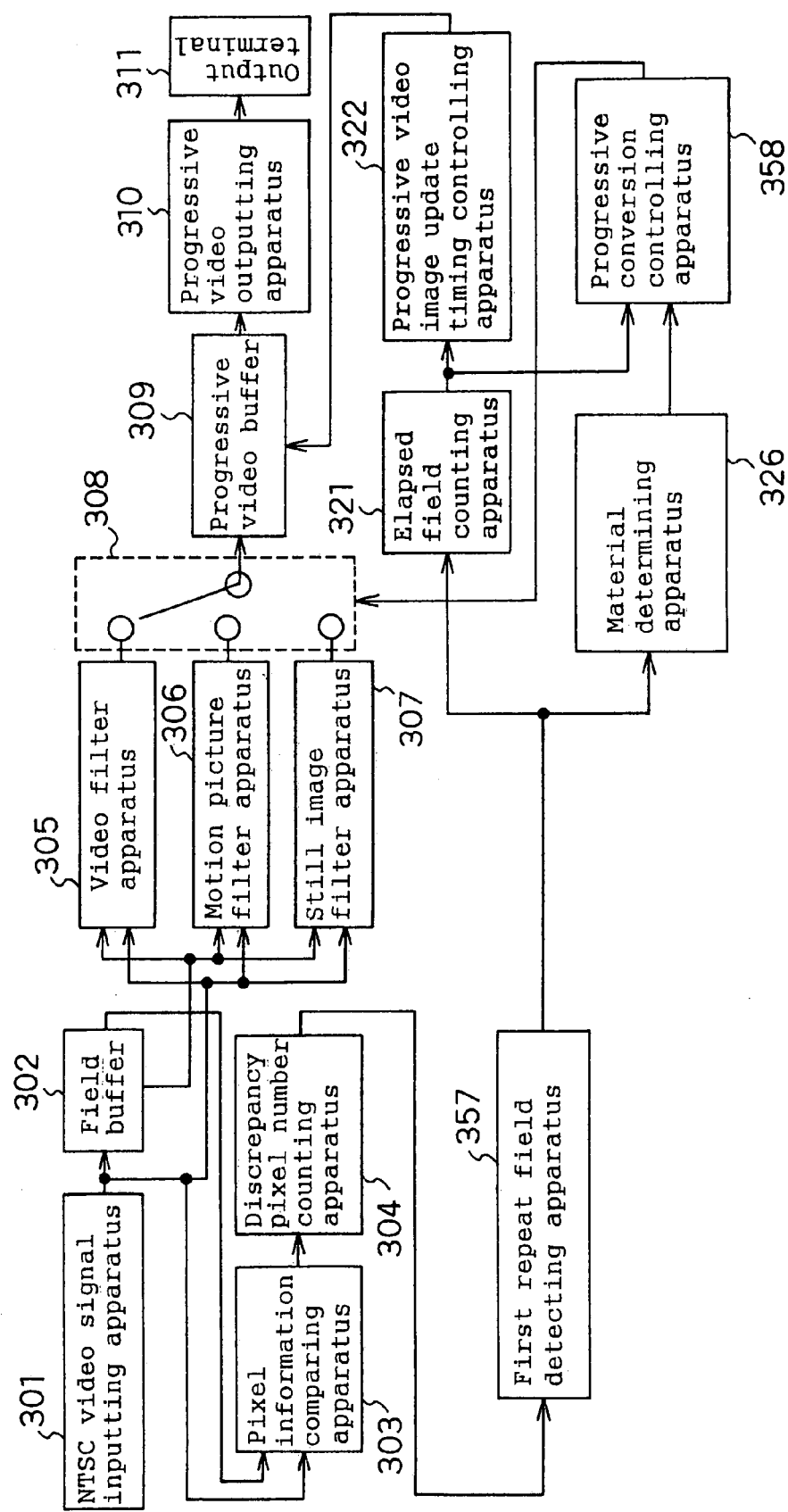
FIG. 14 is a block diagram showing a prior art progressive conversion reproducing apparatus.

FIG. 1 is a block diagram showing a video progressive conversion reproducing apparatus according to Embodiment 1 of the invention. In FIG. 1, like components to FIG. 14 showing a block diagram of a prior art video progressive conversion reproducing apparatus are designated by like numerals. The subject matter different from FIG. 14 is described below.

Numeral 112 indicates a first RF determining apparatus of receiving the discrepancy pixel number counted in the apparatus 304, and then determining whether the present field is a repeat field or not. Numeral 113 indicates an M/N ratio calculating apparatus of receiving the discrepancy pixel number counted in the apparatus 304, and then calculating an M/N ratio indicating the characteristics of the motion and the noise on the time axis of the input video signal. Numeral 114 indicates an RF determination reliability calculating apparatus of receiving the M/N ratio calculated in the apparatus 113, and then outputting a value indicating the reliability of the present determination result of the RF determining apparatus, on the basis of the relation between the RF determination result and the M/N ratio which is measured and recorded in advance. Numeral 115 indicates an M/N ratio adaptive repeat field detecting means of determining the field as an ordinary field until five fields have elapsed from the initial state. After five or more fields have elapsed from the initial state, this M/N ratio adaptive repeat field detecting apparatus determines the field as an ordinary field if the output of the RF determination reliability calculating means outputted from the apparatus 114 is smaller than a predetermined threshold value, and sets the output of the RF determining means outputted from the apparatus 112, as the determination result if the output of the RF determination reliability calculating means is greater than or equal to the predetermined threshold value. Numeral 116 indicates a functional block corresponding to an repeat field detecting apparatus according to the invention. Numeral 117 indicates a scene change detecting apparatus of detecting a scene change on the basis of the discrepancy pixel number outputted from the apparatus 304. Numeral 118 indicates a material determining apparatus of determining on the basis of the repeat field detection result outputted from the apparatus 115 whether the video input signal is video-recorded material, material having been 3-2-pulled down from a motion picture, or material obtained from a still image. Numeral 119 indicates a progressive conversion controlling apparatus of controlling the apparatus 308 so as to select a filter appropriate to the input video signal, on the basis of the material determination result obtained from the apparatus 118 and said elapsed field obtained from the apparatus 321. Numeral 120 indicates an irregular pattern countermeasure controlling apparatus of receiving the output of the apparatus 119, then performing an output such as to select a video filter if the variation in the output of the apparatus 119 during the number of fields defined in the apparatus 120 occurs at a frequency greater than or equal to the threshold value for the number of occurrence defined in the apparatus 120, and outputting the output of the apparatus 119 intact if the frequency of the variation is smaller than the threshold value, so as to reduce the image quality degradation that could be caused by frequent occurrence of filter switching.

The operation of the video progressive conversion reproducing apparatus having such configuration is described below with focusing attention on the difference from that of FIG. 14.

The apparatus 112 receives the discrepancy pixel number counted in the apparatus 304, and then determines whether the present field is a repeat field or not at each time when the video input signal advances by one field.

The apparatus 113 stores the history of the discrepancy pixel numbers which are counted by the apparatus 304 and which range for the past five fields including the present value, at each time when the video input signal advances by one field. Then, the apparatus 113 sets the minimum value among the history of the stored discrepancy pixel numbers as an N component indicating the amount of the noise component on the time axis of the input video signal, at each time when the video input signal advances by one field. After that, the apparatus 113 subtracts the N component value from the sum of all the five values of discrepancy pixel numbers stored in the history, then divides the value by four, and then sets this result as an M component indicating the motion component on the time axis of the video signal. Then, the apparatus 113 calculates an M/N ratio which is the ratio of the M component indicating the motion component on the time axis of the video input signal to the N component indicating the amount of the noise component on the time axis of the video input signal.

On the basis of the M/N ratio outputted from the apparatus 113, the apparatus 114 calculates a value indicating the reliability of the present detection result of the RF determining apparatus, according to information on the relation between the M/N ratio and the reliability of the RF determining apparatus which is measured and recorded in advance. In the information on the relation between the M/N ratio and the reliability of the RF determining apparatus which is measured and recorded in advance, a larger value of the M/N ratio corresponds to a reliability value indicating higher reliability. That is, the apparatus 114 provides a value indicating higher reliability in the reliability of the present detection result of the RF determining apparatus if the video input signal has larger motion or if the video input signal has a smaller noise component.

Until five or more fields have elapsed from the initial state, the apparatus 115 determines the field as an ordinary field. After five or more fields have elapsed, the apparatus 115 compares a predetermined threshold value with the RF determination reliability value outputted from the apparatus 114, then determines the field as an ordinary field if the reliability value is smaller than the threshold value, and sets the output of the apparatus 112 as the determination result if the reliability value is larger than or equal to the threshold value, so as to output a final repeat field detection result. This reduces the probability of performing false progressive conversion, so as to improve the image quality of the output video image processed by video progressive conversion.

On the basis of the output of the apparatus 115 and on the basis of the periodicity of repeat field occurrence, the apparatus 118 determines and outputs whether the video input signal inputted from the apparatus 301 is motion picture material, video material, or still image material.

On the basis of the output of the apparatus 115, the apparatus 321 counts and outputs how many fields have elapsed from the final repeat field. The apparatus 117 compares a predetermined scene change detection offset with the output of the apparatus 304, and thereby detects that the scene is a scene change if the discrepancy pixel number is greater than the offset.

On the basis of the material determination result outputted from the apparatus 118, the scene change information outputted from the apparatus 117, and the M/N ratio outputted from the apparatus 113, the apparatus 119 determines which filter is to be used for generating a progressive video image.

The apparatus 120 receives the output of the apparatus 119, then performs an output such as to select a video filter if the variation in the output of the apparatus 119 during the number of fields defined in the apparatus 120 occurs at a frequency greater than or equal to the threshold value for the number of occurrence defined in the apparatus 120, and outputs the output of the apparatus 119 intact if the frequency of the variation is smaller than the threshold value, so as to reduce the image quality degradation that could be caused by frequent occurrence of filter switching.

On the basis of the output of the apparatus 120, the apparatus 308 provides an output selected from the outputs of the apparatuses 305, 306, and 307. The apparatus 322 controls the update of the progressive video buffer 309 on the basis of the count number in the output of the apparatus 321.

The apparatus 309 receives the progressive video signal selected and outputted from the apparatus 308, in the timing outputted from the apparatus 322, so as to update the video buffer in the apparatus 309.

The apparatus 310 converts the output of the progressive video buffer stored in the apparatus 309 into a progressive video signal, and then outputs the signal through the output terminal of the apparatus 311. As such, a video progressive conversion reproducing apparatus for video signals is constructed.

Figure 2:
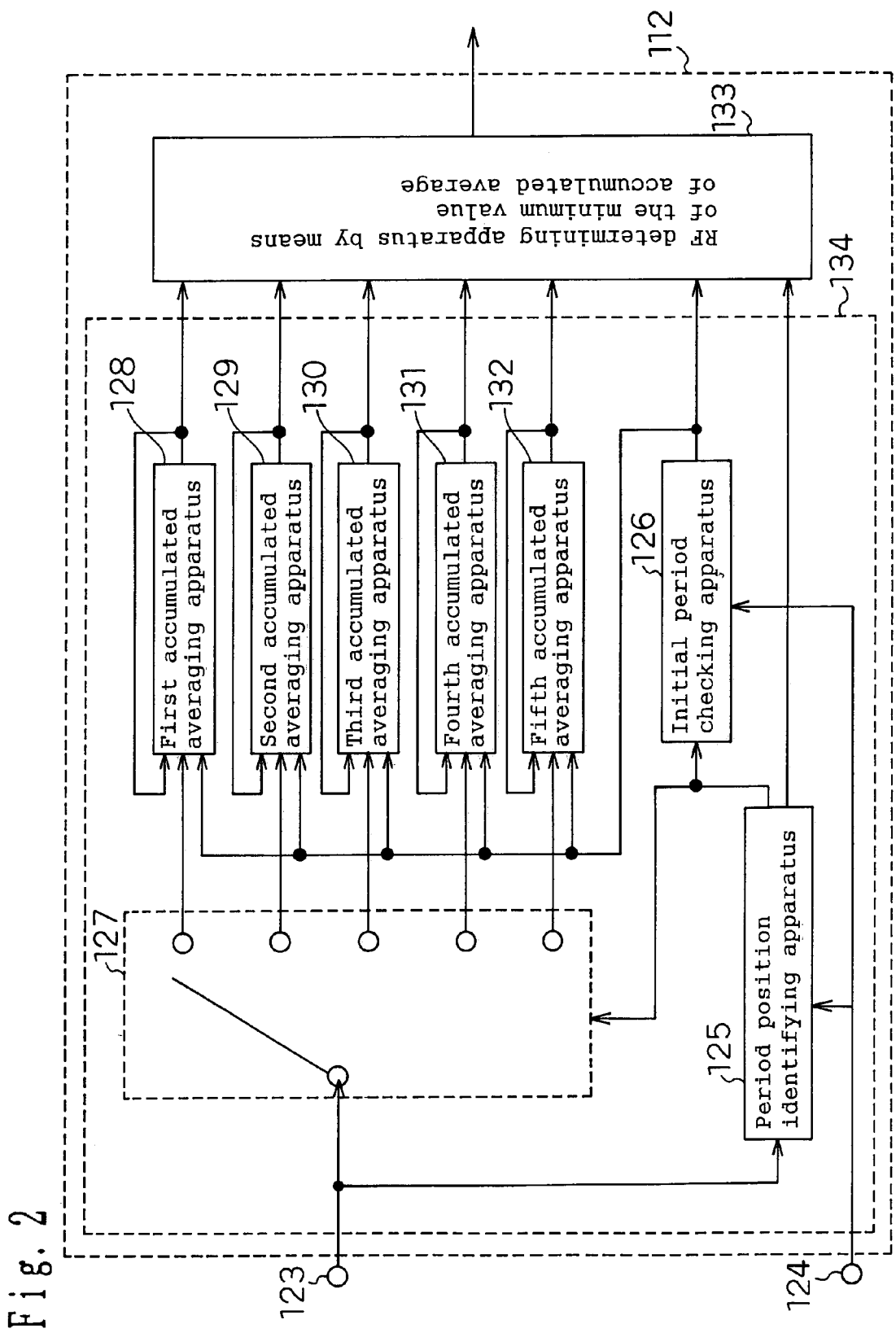
FIG. 2 is a block diagram showing an RF determining means apparatus according to Embodiment 1 of the invention.

FIG. 2 is a block diagram showing the configuration of the apparatus 112. In FIG. 2, numeral 123 indicates a discrepancy pixel number input provided from the apparatus 304. Numeral 124 indicates a scene change detection result input provided from the apparatus 117. Numeral 125 indicates a period position identifying apparatus of being reset if the input from the apparatus 117 is a scene change, and otherwise measuring the period position. Numeral 127 indicates a discrepancy pixel accumulation destination switching apparatus of selecting a destination used for calculating the discrepancy pixels, on the basis of the output of the apparatus 125. Numeral 126 indicates an initial period checking apparatus of being reset if the input from the apparatus 117 is a scene change, then outputting a signal "initial period" until five fields have elapsed from the initial state, and outputting a signal "other than the initial period" after five or more fields have elapsed from the initial state. Numeral 128 indicates a first accumulated average calculating apparatus of storing the input from the apparatus 127 intact in the initial period, and storing the average between the presently stored value and the input from the apparatus 127 in a period other than the initial period. Numeral 129 indicates a second accumulated average calculating apparatus of storing the input from the apparatus 127 intact in the initial period, and storing the average between the presently stored value and the input from the apparatus 127 in a period other than the initial period. Numeral 130 indicates a third accumulated average calculating apparatus of storing the input from the apparatus 127 intact in the initial period, and storing the average between the presently stored value and the input from the apparatus 127 in a period other than the initial period. Numeral 131 indicates a fourth accumulated average calculating apparatus of storing the input from the apparatus 127 intact in the initial period, and storing the average between the presently stored value and the input from the apparatus 127 in a period other than the initial period. Numeral 132 indicates a fifth accumulated average calculating apparatus of storing the input from the apparatus 127 intact in the initial period, and storing the average between the presently stored value and the input from the apparatus 127 in a period other than the initial period. Numeral 133 indicates an RF determining apparatus by means of the minimum value of accumulated average which determines whether the present field is a repeat field or not on the basis of the outputs of the apparatuses 125, 126, 128, 129, 130, 131, and 132. Numeral 134 indicates a block of first through fifth accumulated average calculating apparatuses.

At each time when a discrepancy pixel is provided as the input 123 field by field, the apparatus 125 controls the apparatus 127 so as to cause the five accumulated averaging apparatuses 128-132 to perform an averaging process sequentially field by field. On the basis of the output of the apparatus 125, the apparatus 126 determines whether five or more fields have elapsed from a rest or not. Each of the accumulated averaging apparatuses 128-132 stores the inputted discrepancy pixel number intact if the input from the apparatus 126 does not yet elapsed the initial period, and stores the value obtained by adding the inputted discrepancy pixel number and the stored discrepancy pixel number and then dividing the result by two, if the input from the apparatus 126 has elapsed the initial period. As such, accumulated average is obtained.

Further, scene change information is provided as the input 124. When the information indicates a scene change, the apparatuses 125 and 126 are reset into the initial state. On the basis of the outputs of the apparatuses 128, 129, 130, 131, 132, 126, and 125, the apparatus 133 determines whether the present field is a repeat field or not, and then outputs the result.

Figure 3:
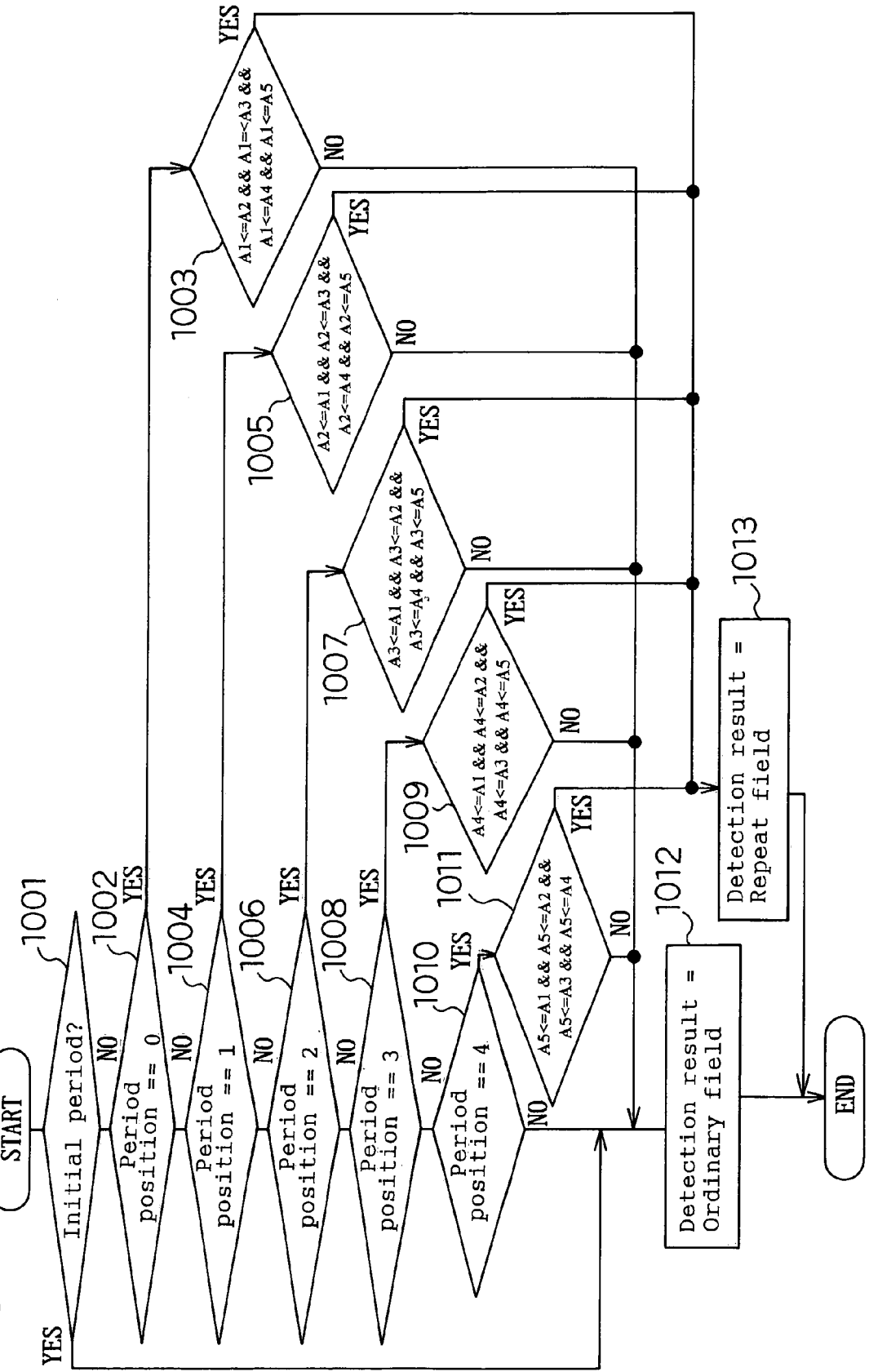
FIG. 3 is a flow chart showing the operation of an RF determining means apparatus by means of the minimum value of accumulated average according to Embodiment 1 of the invention.

FIG. 3 is a flow chart showing the contents of the process in the apparatus 133. In Step 1001, when the input from the apparatus 126 is within the initial period, information for repeat field detection is incomplete. Thus, the apparatus 133 processes Step 1012, thereby confirms the field as an ordinary field, and proceeds to Step 1002 if the period is other than the initial period.

In Step 1002, when the period position outputted from the apparatus 125 is zero which indicates a first accumulated average, the procedure goes to Step 1003. Otherwise, the procedure goes to Step 1004. When first through fifth accumulated average values inputted from the apparatuses 128, 129, 130, 131, and 132 are expressed by five variables A1, A2, ..., A5, respectively, if A1 does not exceed all of the other variables A2, A3, A4, and A5 in Step 1003, the procedure goes to Step 1013, so that the detection result is confirmed as a repeat field. Otherwise, the procedure goes to Step 1012, so that the detection result is determined as an ordinary field.

In Step 1004, when the period position is unity which indicates a second accumulated average, the procedure goes to Step 1005. Otherwise, the procedure goes to Step 1006. In Step 1005, if A2 does not exceed all of the other variables A1, A3, A4, and A5, the procedure goes to Step 1013, so that the detection result is confirmed as a repeat field. Otherwise, the procedure goes to Step 1012, so that the detection result is determined as an ordinary field.

In Step 1006, when the period position is two which indicates a third accumulated average, the procedure goes to Step 1007. Otherwise, the procedure goes to Step 1008. In Step 1007, if A3 does not exceed all of the other variables A1, A2, A4, and A5, the procedure goes to Step 1013, so that the detection result is confirmed as a repeat field. Otherwise, the procedure goes to Step 1012, so that the detection result is determined as an ordinary field.

In Step 1008, when the period position is three which indicates a fourth accumulated average, the procedure goes to Step 1009. Otherwise, the procedure goes to Step 1010. In Step 1009, if A4 does not exceed all of the other variables A1, A2, A3, and A5, the procedure goes to Step 1013, so that the detection result is confirmed as a repeat field. Otherwise, the procedure goes to Step 1012, so that the detection result is determined as an ordinary field.

In Step 1010, when the period position is four which indicates a fifth accumulated average, the procedure goes to Step 1005. Otherwise, the procedure goes to Step 1012, so that the detection result is determined as an ordinary field. In Step 1005, if A5 does not exceed all of the other variables A1, A2, A3, and A4, the procedure goes to Step 1013, so that the detection result is confirmed as a repeat field. Otherwise, the procedure goes to Step 1012, so that the detection result is determined as an ordinary field. As such, repeat field detection is carried out.

As described above, the apparatus 112 detects as a repeat field a field having the minimum value among the accumulated and averaged discrepancy pixel numbers of the five fields. That is, the apparatus 112 determines whether each field given at a period position at an arbitrary time point is a repeat field or not. Then, the apparatus 112 returns the result whether the An (n is any one of integers ranging from 1 through 5) corresponding to the period position specified as a determination object indicates a repeat field (that is, the minimum value) or not. In short, the apparatus 112 performs a determination operation field by field (once a field), so as to return the result whether the present field (period position) is a repeat field or not.

Figure 4:
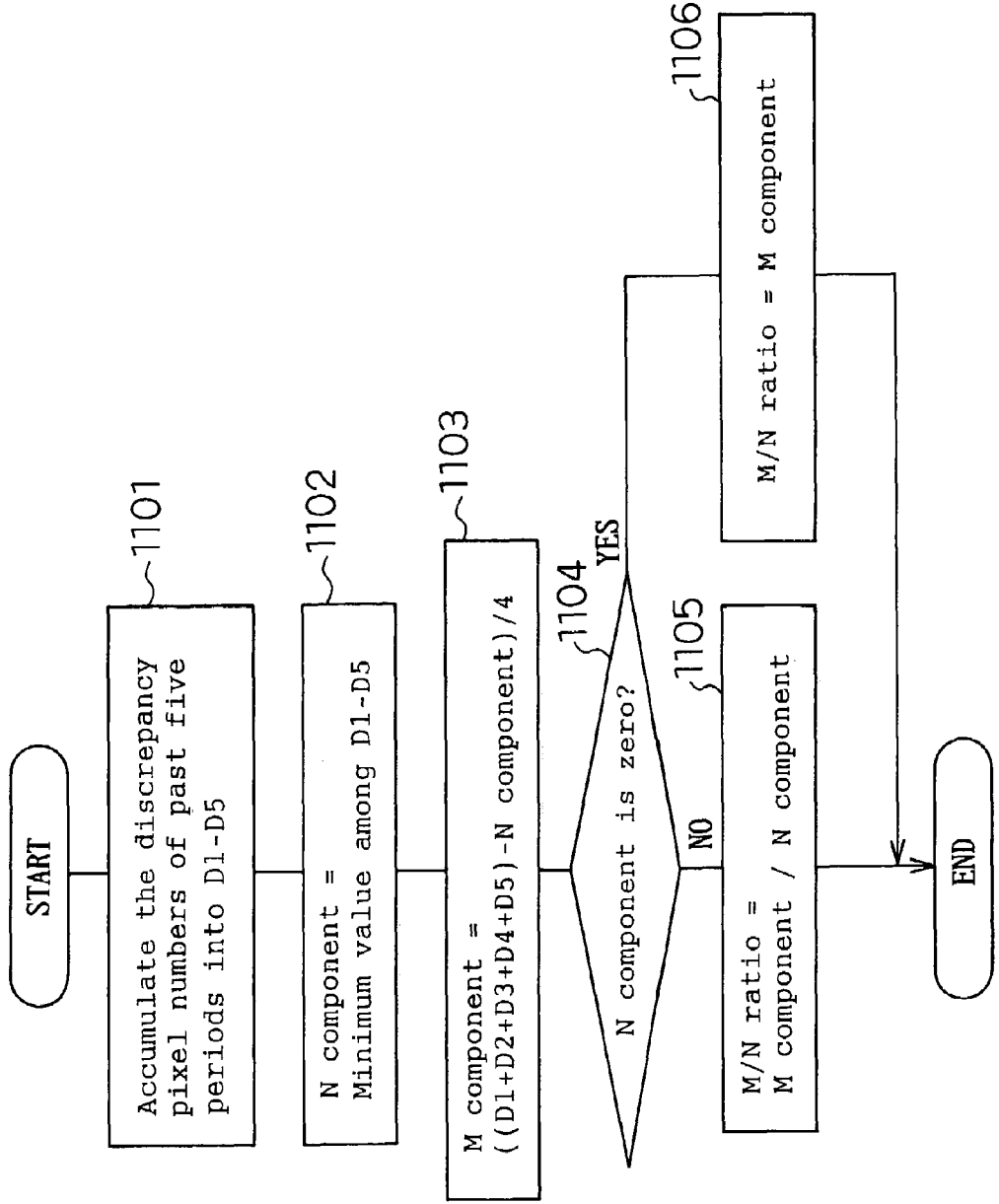
FIG. 4 is a flow chart showing the operation of an M/N ratio calculating apparatus according to Embodiment 1 of the invention.

FIG. 4 is a flow chart showing the contents of the process in the apparatus 113.

In step 1101, the apparatus 113 stores as a history the discrepancy pixel number inputted from the apparatus 304, so as to retain the past five discrepancy pixel numbers in variables D1 through D5.

In Step 1102, the minimum value among D1 through D5 is stored as an N component. In Step 1103, the N component is subtracted from the sum of D1 through D5, and then this value is divided by four, so that the result is set as an M component. That is, the average of the four values D1 through D5 excluding the minimum one is set as the M component.

In Step 1104, it is determined whether the value of the N component is zero or not. In case of non-zero, the procedure goes to Step 1105. In case of zero, the procedure goes to Step 1106.

In Step 1105, the value obtained by dividing the M component by the N component is stored as an M/N ratio. In Step 1106, the M component is stored as the M/N ratio. As a result of these steps, an M/N ratio is obtained as the output of the apparatus 113.

That is, in the apparatus 113, the minimum discrepancy pixel number among the discrepancy pixel numbers of the past five periods is set as the N component. Further, the N component is subtracted from the sum of the discrepancy pixel numbers of the past five periods, and then this value is divided by four, so that the result is set as the M component. The ratio of the M component to the N component is set as the M/N ratio. In short, the apparatus 113 obtains an N component which is the number of discrepancy pixels between the repeat fields and an M component which is the average of the numbers of discrepancy pixels between at least a pair of fields which are other than said repeat fields and have a predetermined distance from each other, and then calculates an M/N ratio which is obtained as the ratio of the M component to the N component.

The present embodiment has been described for the case that the average of the four values consisting of the discrepancy pixel numbers of the past five periods excluding the minimum one is set as the M component. However, the present invention is not limited to this. That is, the average of a part of the four values consisting of the discrepancy pixel numbers of the past five periods excluding the minimum one may be set as the M component.

Figure 5:
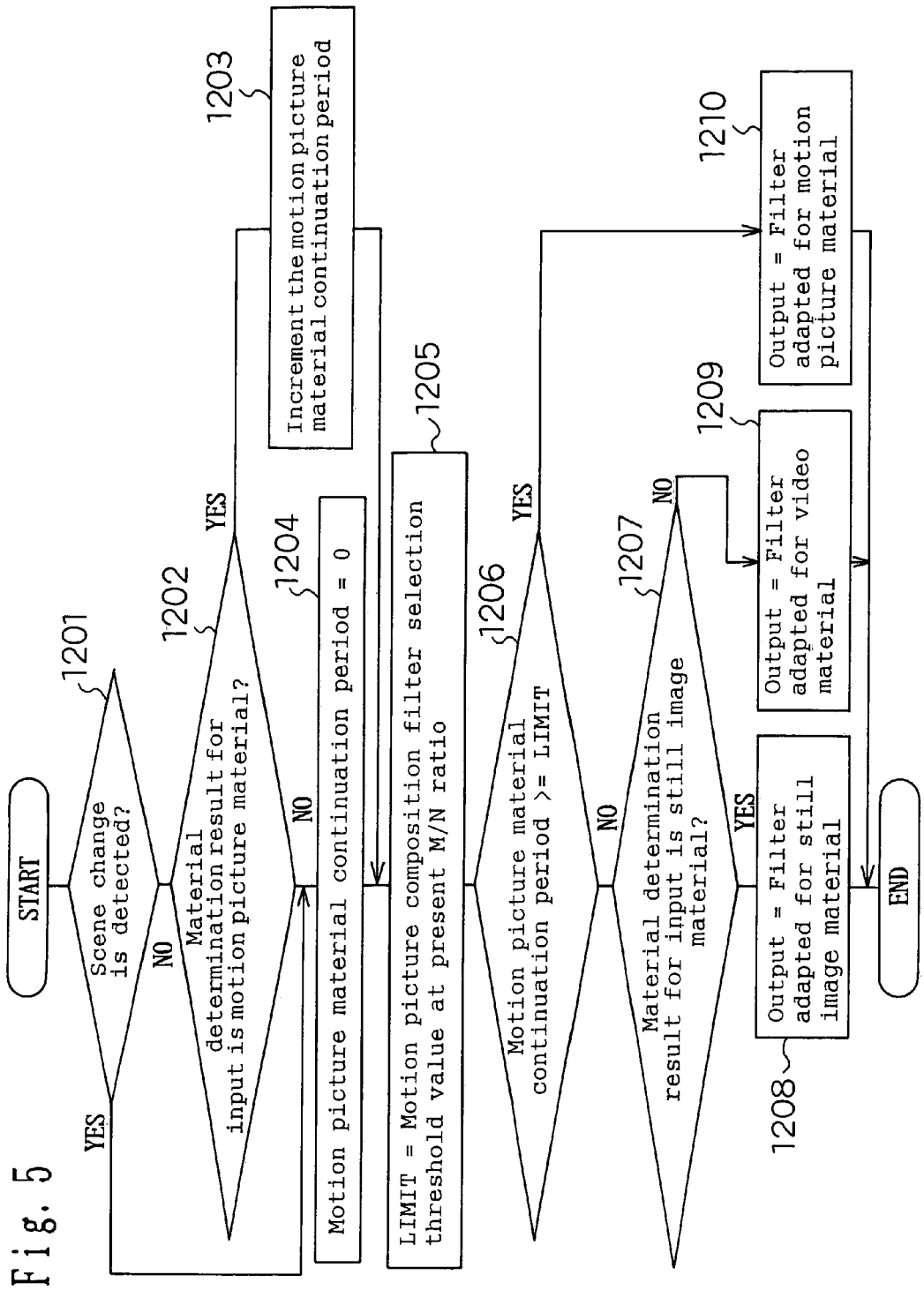
FIG. 5 is a flow chart showing the operation of an M/N ratio adaptive progressive conversion controlling apparatus according to Embodiment 1 of the invention.

FIG. 5 is a flow chart showing the contents of the process in the apparatus 119. In step 1201, the apparatus 119 determines whether the input from the apparatus 117 indicates a scene change or not. In case of no scene change, the procedure goes to Step 1202. In case of a scene change, the procedure goes to Step 1204.

In step 1202, it is determined whether the input from the apparatus 118 is motion picture material or not. In case of no motion picture material, the procedure goes to Step 1204. In case of motion picture material, the procedure goes to Step 1203.

In Step 1203, a motion picture material continuation period (value) serving as a counter of counting the number of periods where motion picture material has successively appeared is incremented by one, and then the procedure goes to Step 1205.

In Step 1204, a motion picture material continuation period (value) serving as a counter of counting the number of periods where motion picture material has successively appeared is cleared into zero, and then the procedure goes to Step 1205.

In Step 1205, on the basis of the M/N ratio inputted from the apparatus 113, a threshold value for motion picture composition filter selection which corresponds to the M/N ratio and which is determined and stored in advance is selected and stored into LIMIT.

In Step 1206, the motion picture material continuation period (value) is compared with the LIMIT. Then, when the motion picture material continuation period (value) is smaller than LIMIT, the procedure goes to Step 1207. When the motion picture material continuation period (value) is greater than or equal to LIMIT, the procedure goes to Step 1210.

In Step 1207, when the input from the apparatus 118 is still image material, the procedure goes to Step 1208. When the input is other than still image material, the procedure goes to Step 1209.

In Step 1208, the output is set to be a filter adapted for still image material. In Step 1209, the output is set to be a filter adapted for video material.

In Step 1210, the output is set to be a filter adapted for motion picture material.

As a result of these steps, the threshold value for selecting a filter adapted for motion picture material is varied depending on the M/N ratio calculated by the apparatus 113. Thus, when the repeat field determination is easy, the filter adapted for motion picture material is selected at a short period. In contrast, when the repeat field determination is difficult, the filter adapted for motion picture material is not selected until the material determination result of the apparatus 118 continues to indicate motion picture material for a longer time. This permits more reliable material determination of the input video signal, and avoids that the quality of the output video signal is degraded by the application of a false filter. This permits the performing of material determination and filter control as accurate as possible and the outputting of a progressive video image as appropriate as possible.

Figure 6:
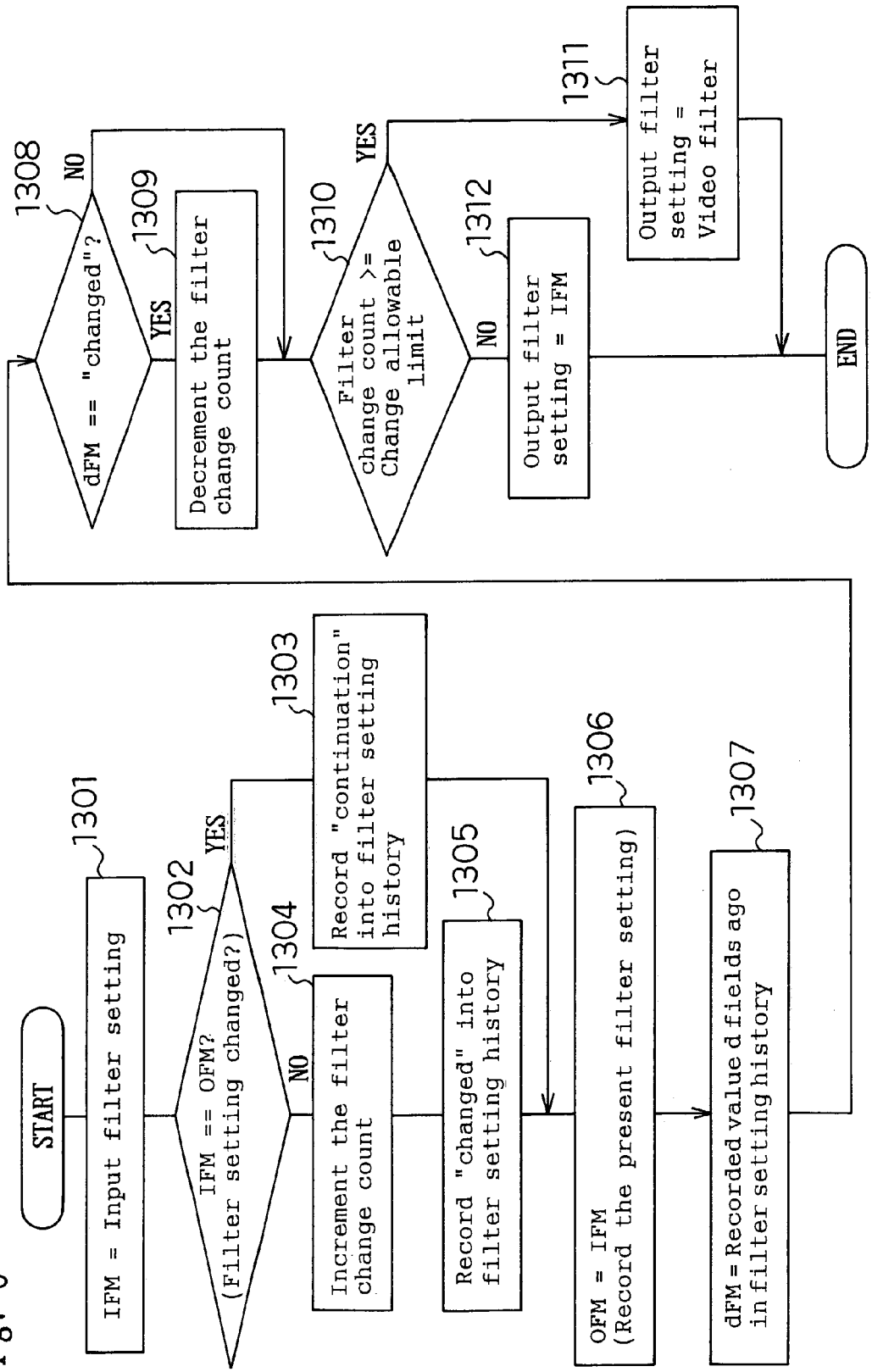
FIG. 6 is a flow chart showing the operation of an irregular pattern countermeasure controlling apparatus according to Embodiment 1 of the invention.

FIG. 6 is a flow chart showing the contents of the process in the apparatus 120. The apparatus 120 comprises: IFM of storing the present filter setting; OFM of storing the preceding filter setting; and a filter setting history of storing the history of the change of filter setting for a field range specified by a parameter d. In step 1301, the filter setting inputted from the apparatus 119 is stored into the IFM of storing the filter setting.

In Step 1302, the OFM of storing the preceding filter setting is compared with the IFM. In case of disagreement, the procedure goes to Step 1304. In case of agreement, the procedure goes to Step 1303.

In Step 1303, information indicating that the filter setting was "continuation" is stored into the filter setting history, and then the procedure goes to Step 1306.

In Step 1304, a filter change count of counting the number of changes of filters is incremented by one.

In Step 1305, information indicating that the filter setting was "changed" is stored into the filter setting history.

In Step 1306, the IFM is stored into the OFM, so that the present input filter setting is recorded.

In Step 1307, the history information d fields ago which is recorded in the filter history is recorded into dFM.

In Step 1308, when the information recorded in the dFM indicates "changed", the procedure goes to Step 1309. Otherwise, the procedure goes to Step 1310.

In Step 1309, the filter change count is decremented by one.

In Step 1310, the filter change count is compared with a change allowable limit which is a changeable threshold value. Then, when the count is greater than or equal to the change allowable limit, the procedure goes to Step 1311. When the count is smaller than the limit, the procedure goes to Step 1312.

In Step 1311, the filter setting to be outputted is set as the video filter. In Step 1312, the filter setting to be outputted is set as that recorded in the IFM.

As a result of these steps, when setting changes more than the change allowable limit have occur within the number of fields indicated by the history depth d, the output setting is set as a video filter, so that the image quality degradation that could be caused by frequent switching of the setting is avoided. When the number of setting changes occurred is less than the change allowable limit, the inputted filter setting is outputted intact. This permits the performing of material determination and filter control as accurate as possible even in case that material recorded in an irregular repeat field pattern or material difficult to be detected by the present system is inputted. Thus, a progressive video image as appropriate as possible is outputted. Further, the history depth d and the change allowable limit can be changed, so that the sensitivity can be adjusted.

As described above, according to the present embodiment, when video material is inputted, a filter adapted for video material is selected. When still image material is inputted, a filter adapted for still image material is selected. When motion picture material has an extremely low M/N ratio and hence the reliability of RF determination is low, the repeat field detection is carried out as video material, so that false composition is avoided. When RF determination is possible but the reliability is not very high, a filter adapted for video material is used until motion picture material determination continues for a long time in the progressive conversion controlling apparatus, so that false determination and false composition are avoided. In case of a high M/N ratio and hence high reliability, a filter adapted for motion picture material is used after a short time in the progressive conversion controlling apparatus, so that the material change is followed rapidly, so that a filter optimal for the material is selected. When the output of the progressive conversion controlling apparatus varies continuously in a short time, the material is determined as material recorded in an irregular repeat field pattern or material difficult to be detected by the present system, so that a filter adapted for video material is selected. This permits the performing of material determination and filter control as accurate as possible even in case of an input video signal having much noise and an input video signal having little motion, so as to permit the outputting of a progressive video image as appropriate as possible.

Embodiment 2

Figure 7:
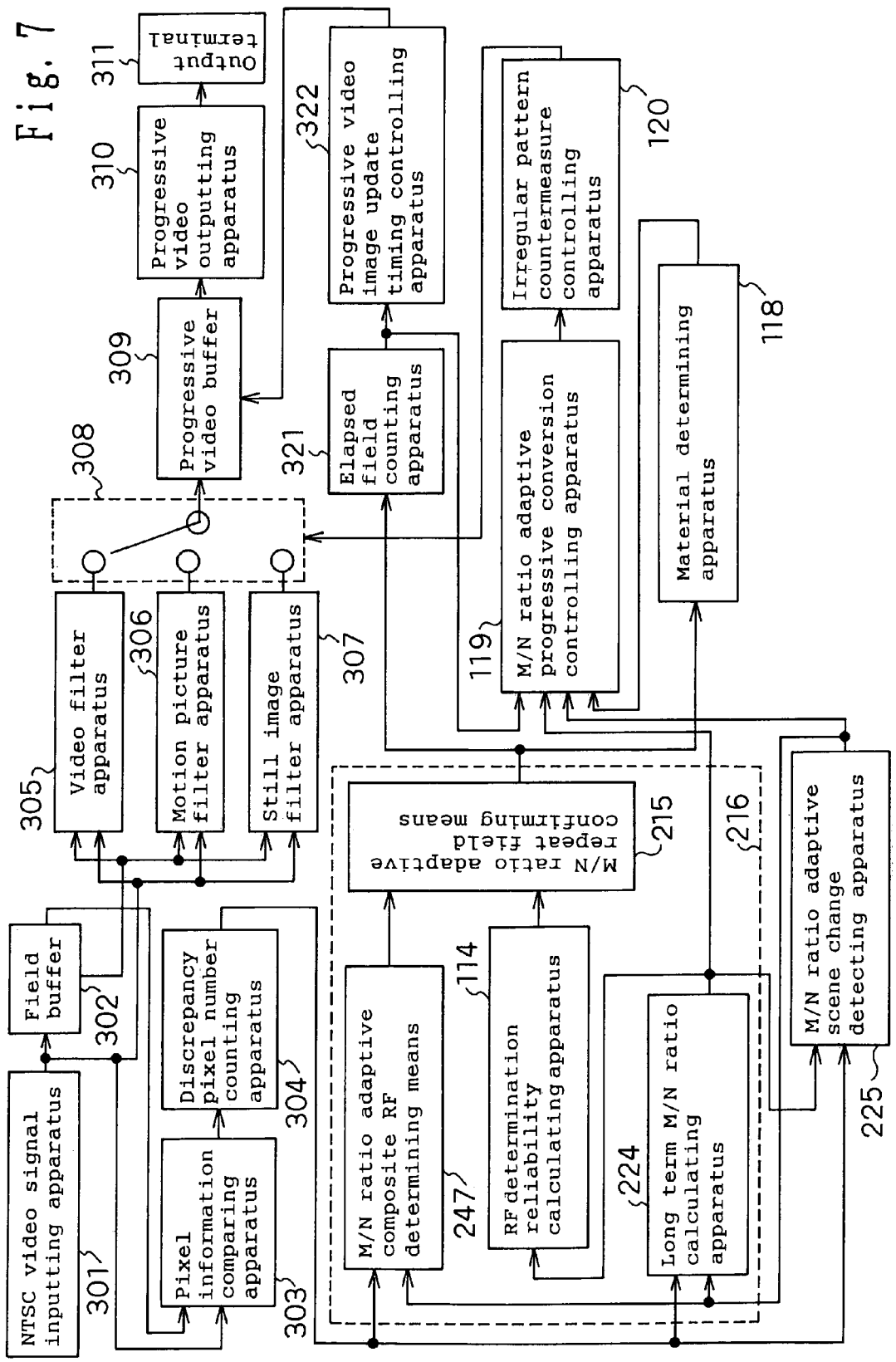
FIG. 7 is a block diagram showing a video progressive conversion reproducing apparatus according to Embodiment 2 of the invention.
Figure 8:
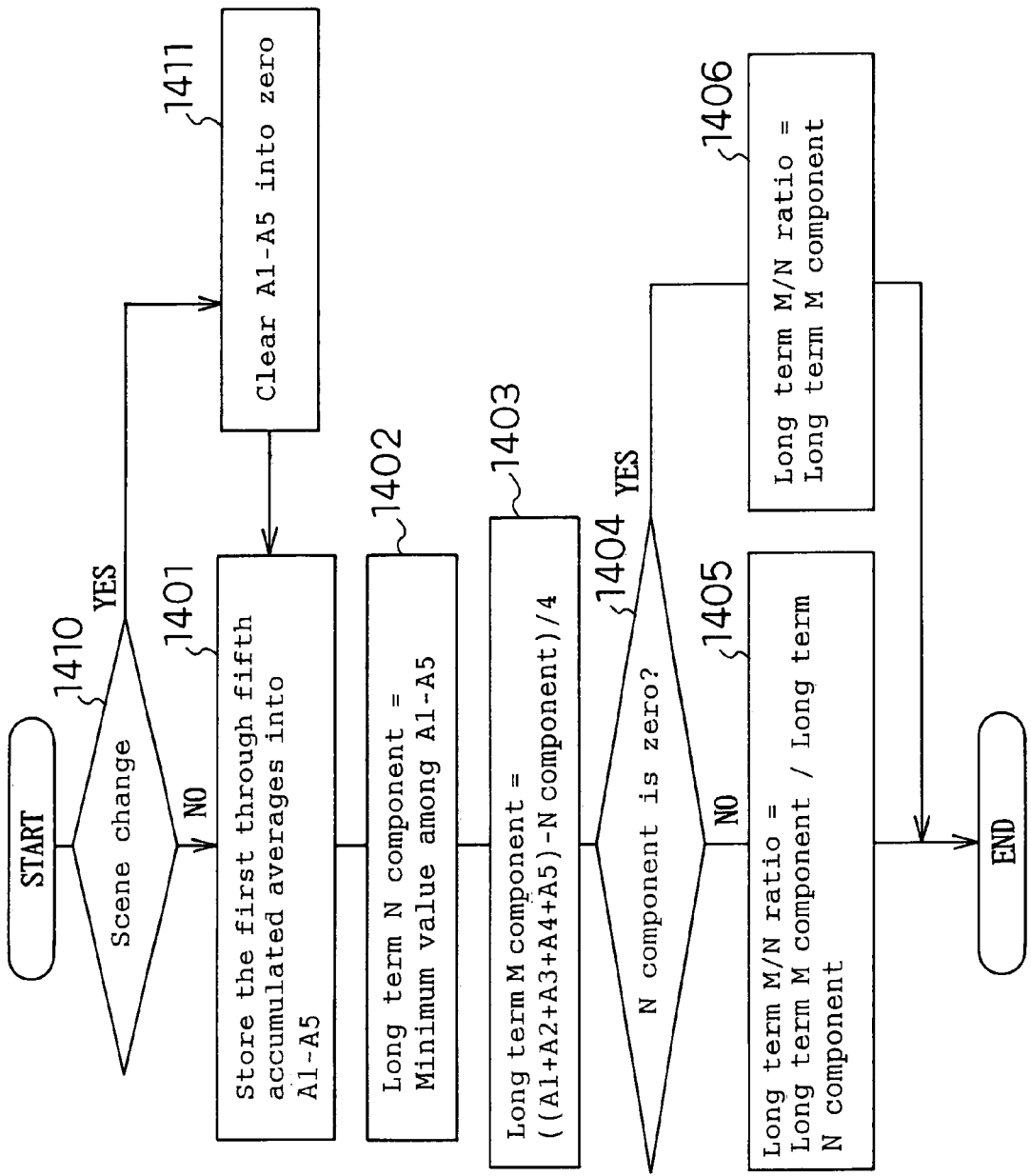
FIG. 8 is a flow chart showing the operation of a long term M/N ratio calculating apparatus according to Embodiment 2 of the invention.

FIG. 7 is a block diagram showing a video progressive conversion reproducing apparatus according to Embodiment 2 of the invention. The differences of FIG. 7 from FIG. 1 are as follows. That is, the apparatus 247 is an M/N ratio adaptive composite RF determining means used in place of the RF determining apparatus 112. The apparatus 224 is a long term M/N ratio calculating apparatus used in place of the apparatus 113. The apparatus 225 is an M/N ratio adaptive scene change detecting apparatus used in place of the apparatus 117. FIG. 8 is a flow chart showing the contents of the process in the apparatus 224.

The apparatus 224 has apparatuses similar to the block of the first through fifth accumulated average calculating apparatuses in the apparatus 134 of FIG. 2. In Step 1410, on the basis of the output from the apparatus 225, the apparatus 224 determines whether the scene is a scene change or not. In case of a scene change, the procedure goes to Step 1411. Otherwise, the procedure goes to Step 1401.

In Step 1411, A1 through A5 are initialized into zero.

In Step 1401, the first through fifth accumulated average values outputted from the first through fifth accumulated average calculating blocks are stored into A1 through A5.

In Step 1402, the minimum value among A1 through A5 is stored as a long term N component. In Step 1403, the long term N component is subtracted from the sum of A1 through A5, and then this value is divided by four, so that the result is set as a long term M component. That is, the average of the four values A1 through A5 excluding the minimum one is set as the long term M component.

In Step 1404, it is determined whether the value of the long term N component is zero or not. In case of non-zero, the procedure goes to Step 1405. In case of zero, the procedure goes to Step 1406.

In Step 1405, the value obtained by dividing the long term M component by the long term N component is stored as a long term M/N ratio.

In Step 1406, the long term M component is stored as the long term M/N ratio.

As a result of these steps, a long term M/N ratio is obtained which is the output of the apparatus 224 and which is the ratio of the motion component to the noise component of the input video signal in a long term on the time axis ranging from a scene change to the present.

That is, on the basis of a discrepancy pixel number which is the number of the pixels having discrepancy between the pixel information of a field of the video input signal and the pixel information of a field of the video input signal having a predetermined distance from the former-mentioned field of the video input signal, and on the basis of information of a scene change, the apparatus 224 obtains an N component which is the number of discrepancy pixels between the repeat fields and an M component which is the number of discrepancy pixels between at least a pair of fields which are other than said repeat fields and have a predetermined distance from each other, and then calculates a long term M/N ratio which is obtained as the ratio of the long term M component to the long term N component of the video input signal on the time axis ranging from a scene change to the present.

Figure 9:
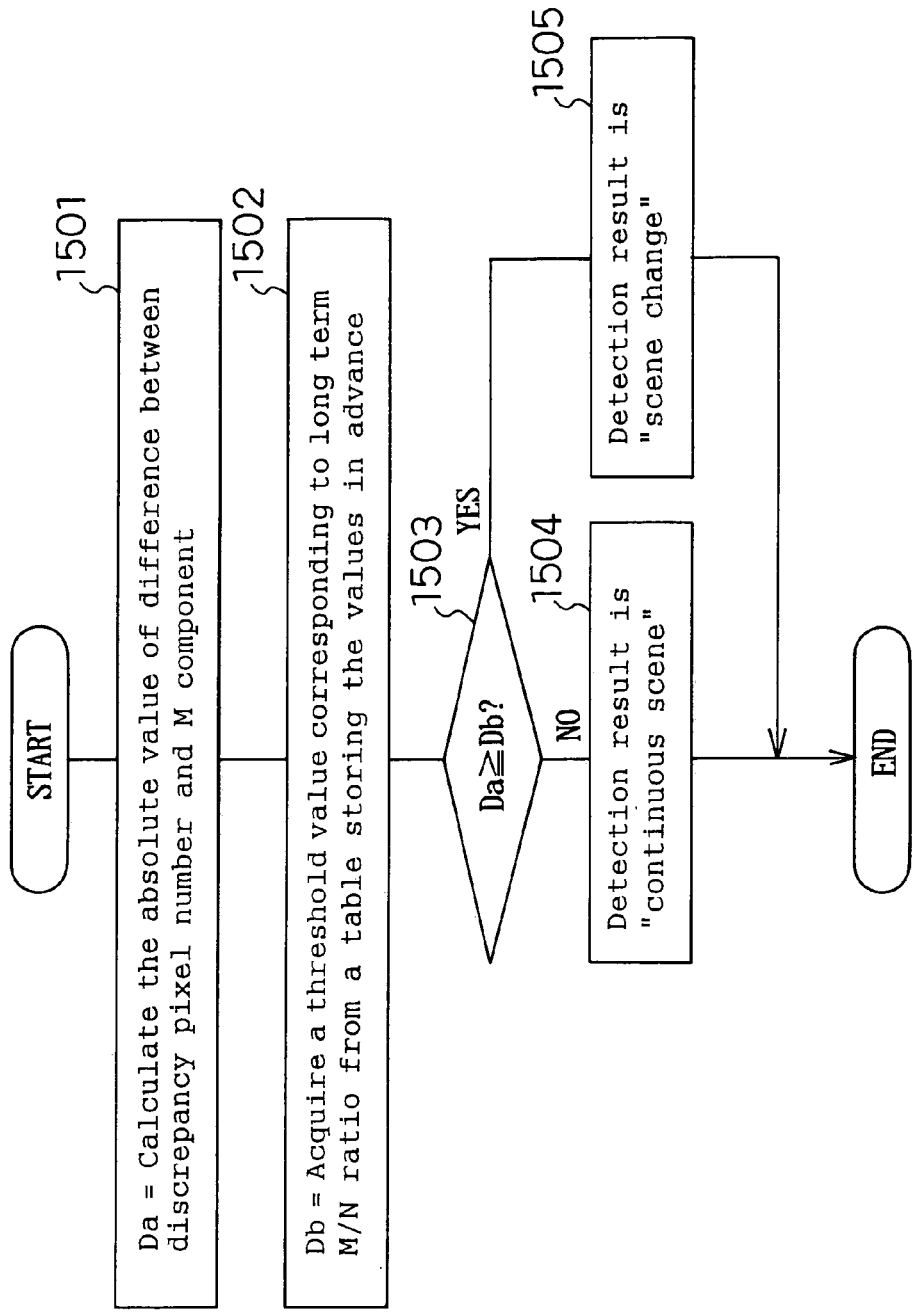
FIG. 9 is a flow chart showing the operation of an M/N ratio adaptive scene change detecting apparatus according to Embodiment 2 of the invention.

FIG. 9 is a flow chart showing the contents of the process in the apparatus 225. The apparatus 225 calculates the absolute value of the difference between the long term M component inputted from the apparatus 224 in Step 1501 and the discrepancy pixel number inputted from the apparatus 304, and then stores this value into a variable Da.

In Step 1502, on the basis of the long term M/N ratio inputted from the apparatus 224, a threshold value for scene change detection which is stored in advance and which is adapted for the M/N ratio is acquired and stored into a variable Db.

In Step 1503, Da is compared with Db. When Da is greater than or equal to the threshold value Db, the procedure goes to Step 1505. When Da is smaller than Db, the procedure goes to Step 1504.

In Step 1504, the detection result is determined as a continuous scene. In Step 1505, the detection result is determined as a scene change.

As a result of these steps, obtained is the effect of avoiding a false determination that when a video image occupying a large portion of the screen moves, false scene changes are detected continuously. Further, the threshold value is changed depending on the M/N ratio. This permits stable detection of a scene change even in case of a video input signal having much noise, and hence permits scene change detection as accurate as possible.

Figure 10:
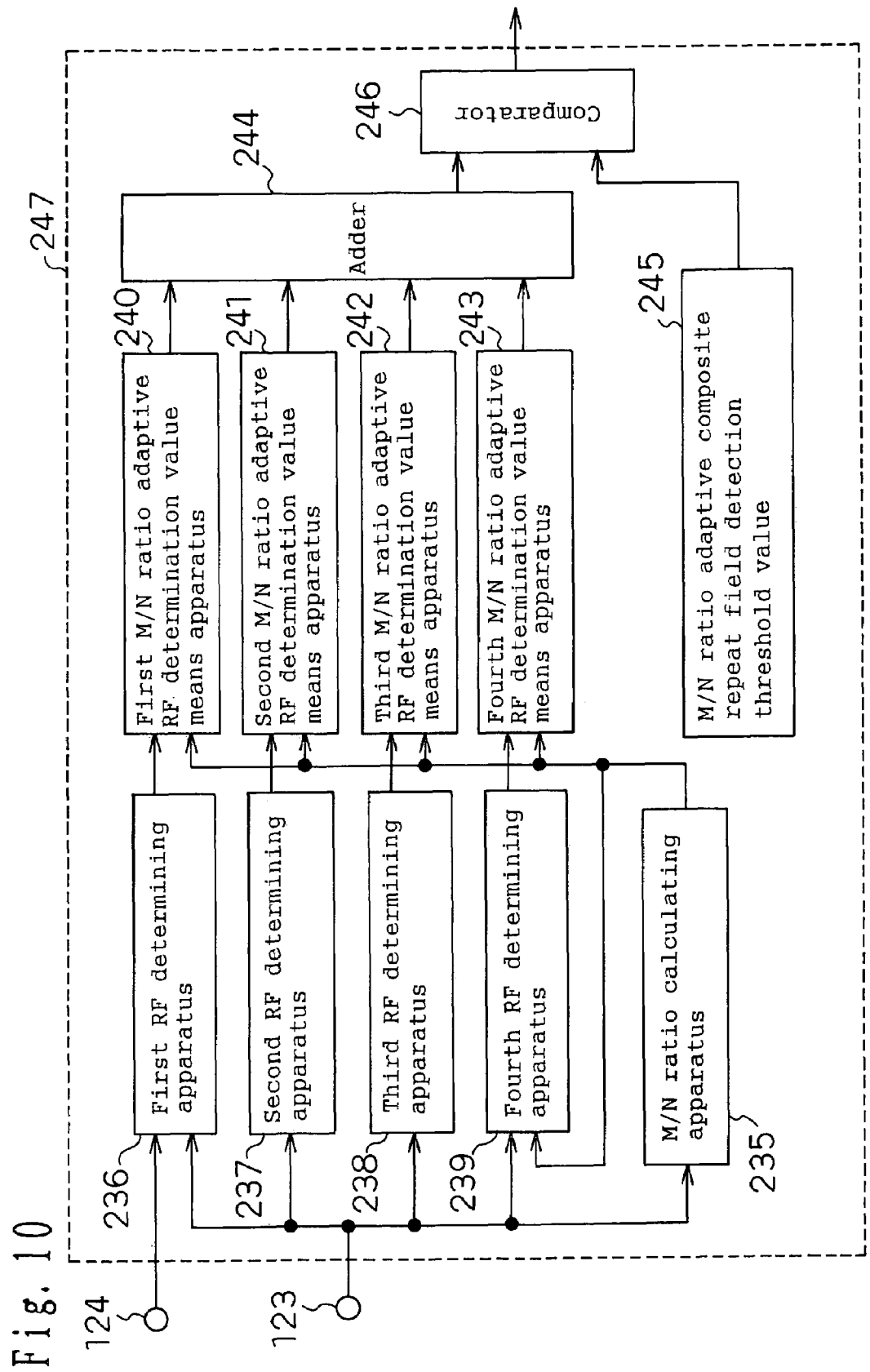
FIG. 10 is a block diagram showing an RF determining means apparatus according to Embodiment 2 of the invention.

FIG. 10 is a block diagram showing the configuration of the apparatus 247. In FIG. 10, numeral 123 indicates a discrepancy pixel number input provided from the apparatus 304. Numeral 124 indicates a scene change detection result input from the apparatus 117. An apparatus 235 is an M/N ratio calculating apparatus similar to the apparatus 113 of FIG. 1. An apparatus 236 is a first RF determining apparatus similar to the apparatus 112 of FIG. 2. An apparatus 237 is a second RF determining apparatus of receiving the discrepancy pixel number, and then determining whether the field is a repeat field or not. An apparatus 238 is a third RF determining apparatus of receiving the discrepancy pixel number, and then determining whether the field is a repeat field or not. An apparatus 239 is a fourth RF determining apparatus of receiving the discrepancy pixel number, and then determining whether the field is a repeat field or not. An apparatus 240 is a first M/N ratio adaptive RF determination value means apparatus of outputting the reliability of the first RF determining means. Here, the reliability is determined on the basis of the M/N ratio outputted from the apparatus 235 according to the relation between the M/N ratio value and the reliability of the first RF determining means which is measured and recorded in advance. When the first RF determining means indicates a repeat field, the reliability value is positive. When the first RF determining means indicates an ordinary field, the reliability value is negative. Further, the degree of reliability is expressed by its absolute value. An apparatus 241 is a second M/N ratio adaptive RF determination value means apparatus of outputting the reliability of the second RF determining means. Here, the reliability is determined on the basis of the M/N ratio outputted from the apparatus 235 according to the relation between the M/N ratio value and the reliability of the second RF determining means which is measured and recorded in advance. When the first RF determining means indicates a repeat field, the reliability value is positive. When the first RF determining means indicates an ordinary field, the reliability value is negative. Further, the degree of reliability is expressed by its absolute value. An apparatus 242 is a third M/N ratio adaptive RF determination value means apparatus of outputting the reliability of the third RF determining means. Here, the reliability is determined on the basis of the M/N ratio outputted from the apparatus 235 according to the relation between the M/N ratio value and the reliability of the third RF determining means which is measured and recorded in advance. When the first RF determining means indicates a repeat field, the reliability value is positive. When the first RF determining means indicates an ordinary field, the reliability value is negative. Further, the degree of reliability is expressed by its absolute value. An apparatus 243 is a fourth M/N ratio adaptive RF determination value means apparatus of outputting the reliability of the fourth RF determining means. Here, the reliability is determined on the basis of the M/N ratio outputted from the apparatus 235 according to the relation between the M/N ratio value and the reliability of the fourth RF determining means which is measured and recorded in advance. When the first RF determining means indicates a repeat field, the reliability value is positive. When the first RF determining means indicates an ordinary field, the reliability value is negative. Further, the degree of reliability is expressed by its absolute value. An apparatus 244 is an adder of adding the outputs of the apparatuses 240, 241, 242, and 243. An apparatus 245 is an M/N ratio adaptive composite repeat field detection threshold value which is a predetermined threshold value. An apparatus 246 is a comparator of comparing the threshold value stored in the apparatus 245 with the output of the apparatus 244, then determining the field as a repeat field if the output of the apparatus 244 is greater than or equal to the threshold value, and determining the field as an ordinary field if the output is smaller than the threshold value. The M/N ratio adaptive composite RF determining apparatus has such configuration. When a high possibility of being a repeat field is found from the RF determination result of the apparatus 236 and the M/N ratio outputted from the apparatus 235, a positive value having a large absolute value is obtained from the apparatus 240, while when a high possibility of being an ordinary field is found, a negative value having a large absolute value is obtained. When a high possibility of being a repeat field is found from the RF determination result of the apparatus 237 and the M/N ratio outputted from the apparatus 235, a positive value having a large absolute value is obtained from the apparatus 241, while when a high possibility of being an ordinary field is found, a negative value having a large absolute value is obtained. When a high possibility of being a repeat field is found from the RF determination result of the apparatus 238 and the M/N ratio outputted from the apparatus 235, a positive value having a large absolute value is obtained from the apparatus 242, while when a high possibility of being an ordinary field is found, a negative value having a large absolute value is obtained. When a high possibility of being a repeat field is found from the RF determination result of the apparatus 239 and the M/N ratio outputted from the apparatus 235, a positive value having a large absolute value is obtained from the apparatus 243, while when a high possibility of being an ordinary field is found, a negative value having a large absolute value is obtained. Since the apparatus 244 adds the outputs of the apparatuses 240, 241, 242, and 243, the detection results strengthen each other if in the same direction, whereas the detection results cancel out each other if in the opposite directions. Thus, when a high possibility of being a repeat field is found, a positive value having a large absolute value is obtained, while when a high possibility of being an ordinary field is found, a negative value having a large absolute value is obtained. As a result, when this value is compared with the threshold value, the repeat field detection is carried out more reliably.

Figure 11:
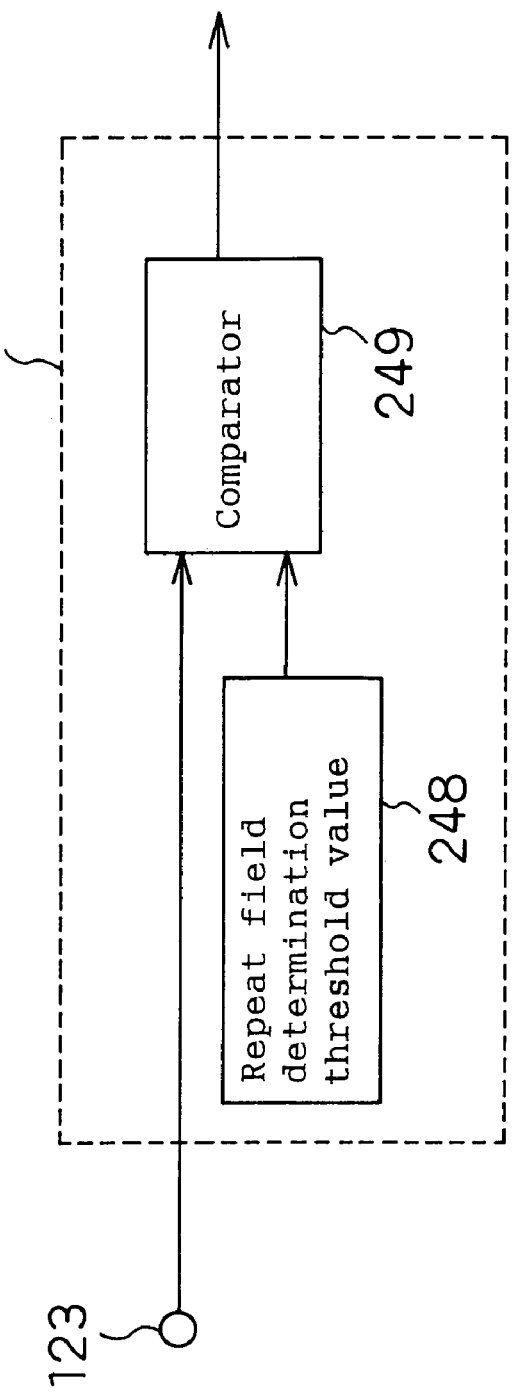
FIG. 11 is a block diagram showing a second RF determining means apparatus according to Embodiment 2 of the invention.

FIG. 11 is a block diagram showing the configuration of the apparatus 237. Numeral 123 indicates a discrepancy pixel number input provided from the apparatus 304. Numeral 248 indicates a threshold value for repeat field determination stored in advance. Numeral 249 indicates a comparator of comparing the discrepancy pixel number provided as the input 123 with the output of the apparatus 248, then determining the field as a repeat field if the discrepancy pixel number is smaller than the threshold value, and determining the field as an ordinary field if the discrepancy pixel number is greater than or equal to the threshold value. The system has such configuration.

Figure 12:
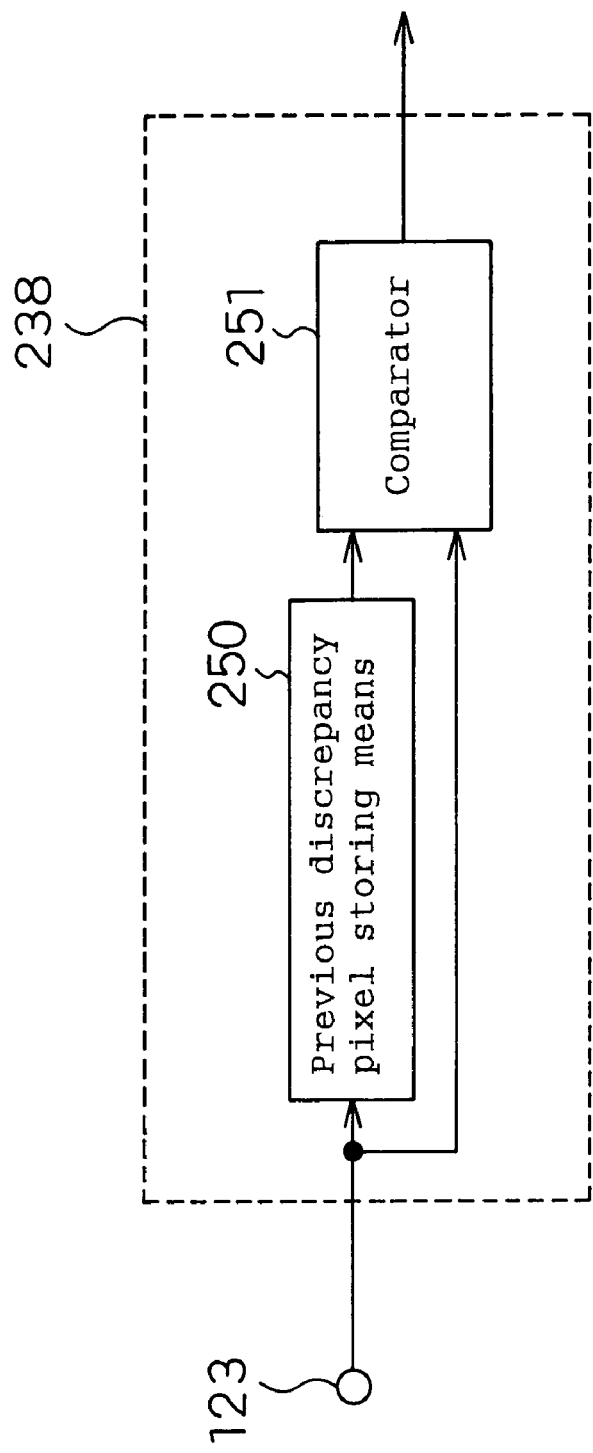
FIG. 12 is a block diagram showing a third RF determining means apparatus according to Embodiment 2 of the invention.

FIG. 12 is a block diagram showing the configuration of the apparatus 238. Numeral 123 indicates a discrepancy pixel number input provided from the apparatus 304. Numeral 250 indicates a previous discrepancy pixel storing apparatus of storing the discrepancy pixel number provided as the input 123. Numeral 251 indicates a comparator of comparing the discrepancy pixel number stored and delayed by one field in the apparatus 250 with the discrepancy pixel number provided as the input 123, then determining the field as a repeat field if the latter discrepancy pixel number is smaller than or equal to the output of the apparatus 250, and determining the field as an ordinary field if the discrepancy pixel number is greater than the output of the apparatus 250. The system has such configuration.

Figure 13:
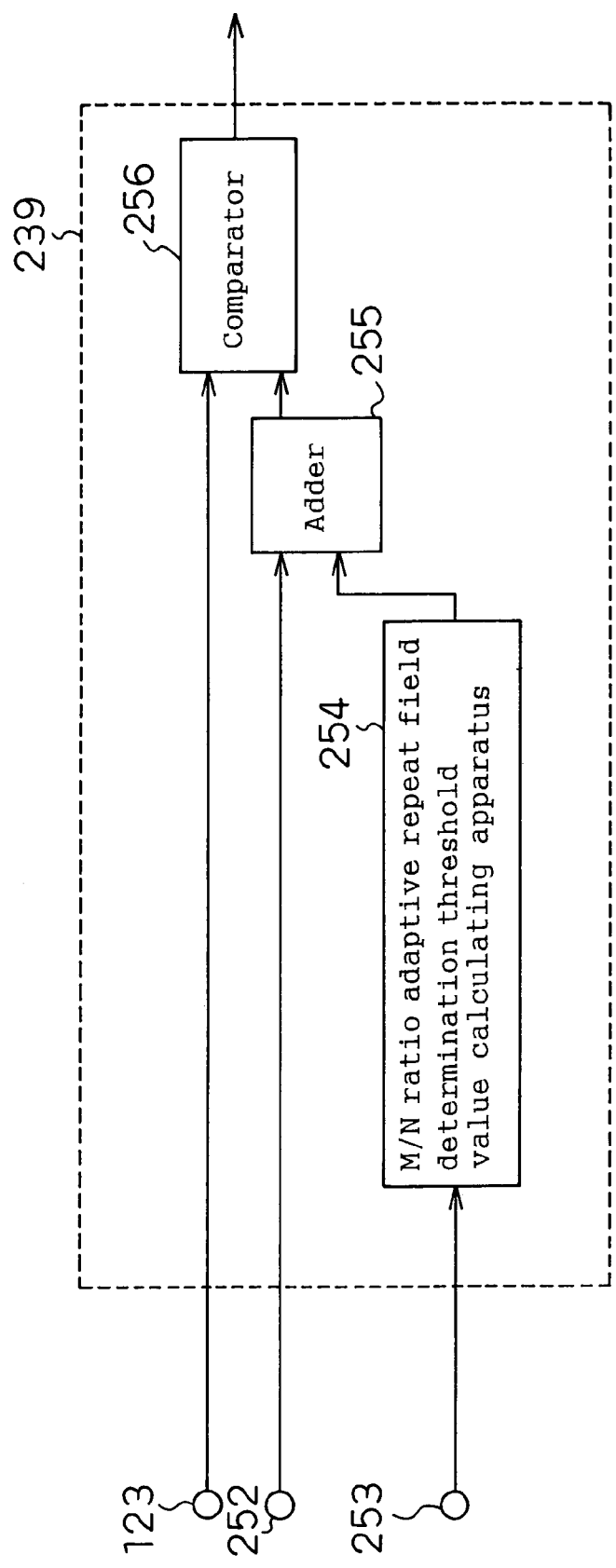
FIG. 13 is a block diagram showing a fourth RF determining means apparatus according to Embodiment 2 of the invention.

FIG. 13 is a block diagram showing the configuration of the apparatus 239. Numeral 123 indicates a discrepancy pixel number input provided from the apparatus 304. Numeral 252 indicates an input of N component provided from the apparatus 235. Numeral 253 indicates an input of M/N ratio provided from the apparatus 235. Numeral 254 indicates an M/N ratio adaptive repeat field determination threshold value calculating apparatus of outputting a threshold value for repeat field detection which is determined and recorded in advance and which corresponds to the M/N ratio, on the basis of the M/N ratio provided as the input 253. Numeral 255 indicates an adder of adding the N component provided as the input 252 to the output of the apparatus 254, and thereby calculating a final threshold value. Numeral 256 indicates a comparator of comparing the output of the apparatus 255 with the discrepancy pixel number provided as the input 123 then determining the field as a repeat field if the discrepancy pixel number is smaller than or equal to the output of the apparatus 255, and determining the field as an ordinary field if the discrepancy pixel number is greater than the output of the apparatus 250. The system has such configuration.

As described above, according to the present embodiment, the RF determining apparatuses 236, 237, 238, and 239 are replaced with the apparatuses 240, 241, 242, and 243 which use the M/N ratio. This improves the detection accuracy in comparison with the prior art. Further, the output results of the RF determining apparatuses having detection characteristics different from each other are combined in the apparatus 224, so that the shortcoming in the respective RF determining apparatuses is compensated with each other, so that the detection accuracy is further improved in the M/N ratio adaptive composite RF determining apparatus. This improves the repeat field detection and hence material determination performance. Further, the apparatus 224 calculates a long term M/N ratio serving as an index concerning the motion component and the noise component of the video input signal on the time axis ranging from an editing point to a measurement time point, and then the apparatus 225 uses this value as an index for scene change detection. This improves the scene change detection accuracy. Furthermore, the apparatus 219 uses the output of the apparatus 224. This permits the performing of filter control as accurate as possible, so as to permit the outputting of a progressive video image as appropriate as possible.

A program according to the invention is a program which causes a computer to execute the function of all or part of the means (or apparatuses, devices, and the like) in the above-mentioned repeat field detecting apparatus according to the invention, and with works in cooperation with the computer.

A recording medium according to the invention is a recording medium which carries a program of causing a computer to execute all or part of the function of all or part of the means (or apparatuses, devices, and the like) of the above-mentioned repeat field detecting apparatus according to the invention, wherein: the recording medium is read out by a computer; and the read-out program performs the above-mentioned function in cooperation with the computer.

The above-mentioned "part of the means (or apparatuses, devices, and the like)" according the invention indicates apiece or pieces of means among plural pieces of said means.

The above-mentioned "function of the means (or apparatuses, devices, and the like)" according the invention indicates all or part of the function of said means.

A mode of use of a program according to the invention may be that the program is recorded in a computer-readable recording medium and works in cooperation with a computer.

A mode of use of a program according to the invention may be that the program is transmitted through a transmitting medium, read out by a computer, and works in cooperation with the computer.

The scope of recording media according to the invention includes a ROM, while the scope of transmitting media according to the invention includes a transmitting medium such as the Internet, as well as light, radio waves, and acoustic waves.

A computer according to the invention is not restricted to genuine hardware such as a CPU, and may be firmware, an OS, and a peripheral device.

As described above, a configuration according to the invention may be implemented by software or hardware.

INDUSTRIAL APPLICABILITY

As described above, the invention advantageously provides: a video progressive conversion reproducing apparatus of performing repeat field detection as accurately as possible so as to perform material determination and filter control as accurately as possible even in case of a scene having little motion, in case of degradation in the quality of video material, in case that noise on the time axis is introduced owing to the use of three-dimensional noise reduction, or in case that the video is recorded in irregular patterns; a repeat field detecting apparatus; a repeat field detecting method; a program; and a recording medium.

The invention claimed is:

1. A repeat field detecting apparatus which is used in a video progressive conversion reproducing apparatus of converting a video input signal of interlace scheme into a video signal of progressive scheme and which detects whether said video input signal is a repeat field where the same video image is outputted repeatedly or an ordinary field which is other than said repeat field, said repeat field detecting apparatus comprising:

a first RF determining means of identifying a repeat field having a predetermined distance from said video input signal, on the basis of a discrepancy pixel number which is the number of the pixels having discrepancy between the pixel information of a field of said video input signal and the pixel information of a field of said video input signal having a predetermined distance from the former-mentioned field of the video input signal;

M/N ratio calculating means of obtaining an N component which is the number of discrepancy pixels between repeat fields and an M component which is the number of discrepancy pixels between at least a pair of fields which are other than said repeat fields and have said predetermined distance from each other, and then calculating an M/N ratio which is the ratio of said M component to said N component;

RF determination reliability calculating means of outputting the reliability of the determination result of said first RF determining means on the basis of the output of said M/N ratio calculating means; and M/N ratio adaptive repeat field confirming means of confirming the output of said first RF determining means as the determination result on the basis of said reliability outputted from said RF determination reliability calculating means.

2. A repeat field detecting apparatus according to claim 1, wherein said predetermined distance is a distance having one field therebetween, and wherein said at least a pair of fields are one or more pairs of fields among four pairs of fields which adjoin the arbitrary pair of fields which measure a M/N ratio.

3. A repeat field detecting apparatus according to claim 1, wherein said at least a pair is two pairs or more, and wherein said M component is the average between the discrepancy pixel numbers of said two pairs or more of fields.

4. A repeat field detecting apparatus according to claim 1, wherein said M/N ratio adaptive repeat field confirming means determines the field as an ordinary field until five fields have elapsed from the initial state, and wherein after five or more fields have elapsed from the initial state, said M/N ratio adaptive repeat field confirming means determines the field as an ordinary field when the output of said RF determination reliability calculating means is smaller than a predetermined threshold value, and sets the output of said first RF determining means as the determination result when the output of said RF determination reliability calculating means is greater than or equal to said predetermined threshold value.

5. A repeat field detecting apparatus according to claim 1, wherein said M/N ratio calculating means comprises:

discrepancy pixel history means of storing the history of said discrepancy pixel numbers for the past five fields including the present value at each time when said video input signal advances by one field;

N component detecting means of setting the minimum value among the values stored in said discrepancy pixel history means as an N component indicating the amount of the noise component on the time axis of the input video signal, at each time when said video input signal advances by one field;

M component detecting means of subtracting the value detected by said N component detecting means from the sum of all the five values stored in said discrepancy pixel history means, then dividing the value by four, and then setting this result as an M component indicating the motion component on the time axis of the video signal, at each time when said video input signal advances by one field; and calculating means of calculating an M/N ratio which is the ratio of said M component to said N component.

6. A repeat field detecting apparatus according to claim 1, wherein said RF determination reliability calculating means returns a value indicating the reliability of said first RF determining means corresponding to the output value of said M/N ratio calculating means, on the basis of previously-obtained information indicating the relation between the reliability of said first RF determining means and the output of said M/N ratio calculating means and on the basis of the output provided from said M/N ratio calculating means.

7. A repeat field detecting apparatus according to claim 1, wherein said first RF determining means comprises:

period position identifying means of being initialized by an initialization input, then being incremented by one at each time when said discrepancy pixel number is received in association with the elapse of one field, and then returning to the initial value after the elapse of five fields, so as to output a period position;

initial period checking means of outputting whether said period position identifying means has advanced by one or more periods or not;

first through fifth accumulated averaging means of calculating the average of said discrepancy pixel numbers when said period position identifying means indicates the n-th field (n=1 through 5), so that the average is stored into the n-th accumulated averaging means; and determining means of determining the field as a repeat field when the output value selected from the output values of said first through fifth accumulated averaging means in correspondence to the output value of said period position identifying means is the minimum one among the output values of said first through fifth accumulated averaging means, and otherwise determining the field as an ordinary field.

8. A repeat field detecting apparatus according to claim 7, comprising scene change detecting means of determining the presence or absence of a scene change in said video input signal on the basis of said discrepancy pixel number, wherein said initialization input is an input provided from said scene change detecting means when the output of said scene change detecting means indicates a scene change, and wherein said n-th accumulated averaging means stores said discrepancy pixel number when said initial period checking means is in the initial state and when said period position identifying means indicates the n-th field, and stores the average between said discrepancy pixel number and the value stored in said n-th accumulated averaging means when said initial period checking means is in a state other than the initial state and when said period position identifying means indicates the n-th field, and further resets said period position identifying means and said initial period checking means when the output of said scene change detecting means indicates a scene change.

9. A repeat field detecting apparatus which is used in a video progressive conversion reproducing apparatus of converting a video input signal of interlace scheme into a video signal of progressive scheme and which detects whether said video input signal is a repeat field where the same video image is outputted repeatedly or an ordinary field which is other than said repeat field, said repeat field detecting apparatus comprising:

long term M/N ratio calculating means of obtaining an N component which is the number of discrepancy pixels between said repeat fields and an M component which is the number of discrepancy pixels between at least a pair of fields which are other than said repeat fields and have said predetermined distance from each other, on the basis of a discrepancy pixel number which is the number of the pixels having discrepancy between the pixel information of a field of said video input signal and the pixel information of a field of said video input signal having a predetermined distance from the former-mentioned field of the video input signal and on the basis of information of a scene change, and then calculating a long term M/N ratio which is the ratio of said M component to said N component on the time axis of said video input signal ranging from the scene change to the present;

M/N ratio adaptive scene change detecting means of determining the presence or absence of a scene change in said video input signal on the basis of said discrepancy pixel number and the output of said long term M/N ratio calculating means;

M/N ratio adaptive composite RF determining means of detecting a repeat field on the basis of said discrepancy pixel number and the output of said M/N ratio adaptive scene change detecting means;

RF determination reliability calculating means of outputting the reliability of said M/N ratio adaptive composite RF determining means on the basis of the output of said long term M/N ratio calculating means; and M/N ratio adaptive repeat field confirming means of confirming the output of said first RF determining means as the determination result on the basis of said reliability outputted from said RF determination reliability calculating means; and wherein said information of a scene change is the determination result of said M/N ratio adaptive scene change detecting means.

10. A repeat field detecting apparatus according to claim 9, wherein said predetermined distance is a distance having one field therebetween, and wherein said at least a pair of fields are one or more pairs of fields among four pairs of fields which adjoin the arbitrary pair of fields which measure a M/N ratio.

11. A repeat field detecting apparatus according to claim 9, wherein said at least a pair is two pairs or more, and wherein said M component is the average between the discrepancy pixel numbers of said two pairs or more of fields.

12. A repeat field detecting apparatus according to claim 9, wherein said M/N ratio adaptive composite RF determining means comprises:

a first RF determining means according to claim 7;

a second RF determining means of comparing said discrepancy pixel number with a second RF determination threshold value which is a predetermined value, then detecting that the field is a repeat field if said discrepancy pixel number is smaller than said second RF determination threshold value, and detecting that the field is an ordinary field if said discrepancy pixel number is greater than said second RF determination threshold value;

discrepancy pixel storing means of storing said discrepancy pixel number and then outputting said discrepancy pixel number with a delay of one field;

a third RF determining means of comparing the output of said discrepancy pixel storing means with said discrepancy pixel number, then detecting that the field is a repeat field if said discrepancy pixel number is smaller than or equal to the output of said discrepancy pixel storing means, and detecting that the field is an ordinary field if said discrepancy pixel number is greater than the output of said discrepancy pixel storing means;

M/N ratio calculating means of calculating an M/N ratio which is the ratio of the motion component to the noise component on the time axis of said video input signal, from said discrepancy pixel number;

a fourth RF determining means of selecting a threshold value obtained in advance for the purpose of repeat field detection in correspondence to an M/N ratio based on the output of said M/N ratio calculating means, then comparing said discrepancy pixel number with a fourth RF determination threshold value generated by adding the inputted N component to said selected threshold value, then detecting that the field is a repeat field if said discrepancy pixel number is smaller than said fourth RF determination threshold value, and detecting that the field is an ordinary field if said discrepancy pixel number is greater than said fourth RF determination threshold value; m-th (m=1 through 4) RF determining means on the basis of the output of said M/N ratio calculating means; and adding means of adding the output of said m-th M/N ratio adaptive RF determination value means, then comparing this result with an M/N ratio adaptive composite RF determination threshold value which is a predetermined value, then determining the field as a repeat field when said result is greater than said threshold value, and determining the field as an ordinary field when said result is smaller than said threshold value.

13. A repeat field detecting apparatus according to claim 12, wherein said m-th (m=1 through 4) M/N ratio adaptive RF determination value means outputs a value which is a predetermined and recorded value corresponding to the output of the M/N ratio calculating means and indicating the reliability of the m-th RF determining means, and which is positive for a repeat field and is negative for an ordinary field, and further the absolute value of which indicates the reliability, wherein a large value indicates high reliability, while a small value indicates low reliability.

14. A repeat field detecting apparatus according to claim 9, wherein said long term M/N ratio calculating means comprises:

period position identifying means of being initialized by an initialization input, then being incremented by one at each time when said discrepancy pixel number is received in association with the elapse of one field, and then returning to the initial value after the elapse of n fields (n=1 through 5), so as to output a period position;

initial period checking means of outputting whether said period position identifying means has advanced by one or more periods or not;

first through fifth accumulated averaging means of calculating the average of said discrepancy pixel numbers when said period position identifying means indicates the n-th field, so that the average is stored into the n-th accumulated averaging means;

long term N component means of setting the minimum value among the output values of said first through n-th accumulated averaging means as a long term N component indicating the amount of the noise component on the time axis of the input video signal, on the basis of said n-th accumulated averaging means at each time when said video input signal advances by one field;

long term M component means of subtracting the value of said long term N component means from the sum of all the output values of said first through n-th accumulated averaging means, then dividing the value by n−1, and then setting this result as a long term M component indicating the motion component on the time axis of the video signal, at each time when said video input signal advances by one field; and calculating means of calculating a long term M/N ratio which is the ratio of said long term M component to said long term N component.

15. A repeat field detecting apparatus according to claim 14, wherein said M/N ratio adaptive scene change detecting means compares the absolute value of the difference between said discrepancy pixel number and said long term M component with said M/N-ratio dependent threshold value, then determines the scene as a continuous scene when said absolute value is smaller than the threshold value, and determines the scene as a scene change when said absolute value is greater than or equal to the threshold value.

16. A video progressive conversion reproducing apparatus comprising:

a repeat field detecting apparatus according to claim 8;

motion picture material continuation period identifying means of being incremented by one when said video input signal is motion picture material, and being cleared into zero for video material, and further being cleared into zero also when said scene change detecting means or said M/N ratio adaptive scene change detecting means outputs a determination indicating a scene change, so as to count the periods where the motion picture determination is in continuation;

motion picture composition filter selection threshold value calculating means of calculating a threshold value varying depending on the output of said M/N ratio calculating means; and M/N ratio adaptive progressive conversion controlling means of comparing the output of said motion picture composition filter selection threshold value calculating means with said motion picture material continuation period, then performing an output such as to set a filter appropriate for motion picture material if the former-mentioned output is greater than said motion picture composition filter selection threshold, and performing an output such as to set a filter appropriate for a still image if said output is smaller than said motion picture composition filter selection threshold and if said material determining means determines the field as a still image, and otherwise performing an output such as to set a filter appropriate for video material.

17. A video progressive conversion reproducing apparatus comprising:

a repeat field detecting apparatus according to claim 15;

motion picture material continuation period identifying means of being incremented by one when said video input signal is motion picture material, and being cleared into zero for video material, and further being cleared into zero also when said scene change detecting means or said M/N ratio adaptive scene change detecting means outputs a determination indicating a scene change, so as to count the periods where the motion picture determination is in continuation;

motion picture composition filter selection threshold value calculating means of calculating a threshold value varying depending on the output of said long term M/N ratio calculating means; and M/N ratio adaptive progressive conversion controlling means of comparing the output of said motion picture composition filter selection threshold value calculating means with said motion picture material continuation period, then performing an output such as to set a filter appropriate for motion picture material if the former-mentioned output is greater than said motion picture composition filter selection threshold, and performing an output such as to set a filter appropriate for a still image if said output is smaller than said motion picture composition filter selection threshold and if said material determining means determines the field as a still image, and otherwise performing an output such as to set a filter appropriate for video material.

18. A video progressive conversion reproducing apparatus according to claim 16 or 17, comprising:

filter change history means of recording as a history the information whether the filter setting has been changed in said M/N ratio adaptive progressive conversion controlling means or not;

filter change frequency detecting means of being incremented by one when the filter setting is changed in said M/N ratio adaptive progressive conversion controlling means, and being decremented by one when the filter change information delayed by d fields in said filter change history means indicates a filter change, so as to detect the filter change frequency in the past d fields; and irregular pattern countermeasure controlling means of comparing with a filter variation allowable limit frequency indicating the allowable limit for filter variation, and then, if said filter change frequency is greater than the allowable limit, causing said filter selecting means to select video filter means and changing said d value and said filter variation allowable limit so as to adjust the sensitivity.

19. A repeat field detecting method which is used in a video progressive conversion reproducing apparatus of converting a video input signal of interlace scheme into a video signal of progressive scheme and which detects whether said video input signal is a repeat field where the same video image is outputted repeatedly or an ordinary field which is other than said repeat field, said repeat field detecting method comprising:

an RF determining step of identifying a repeat field having a predetermined distance from said video input signal, on the basis of a discrepancy pixel number which is the number of the pixels having discrepancy between the pixel information of a field of said video input signal and the pixel information of a field of said video input signal having a predetermined distance from the former-mentioned field of the video input signal;

an M/N ratio calculating step of obtaining an N component which is the number of discrepancy pixels between said repeat fields and an M component which is the number of discrepancy pixels between at least a pair of fields which are other than said repeat fields and have said predetermined distance from each other, and then calculating an M/N ratio which is the ratio of said M component to said N component;

an RF determination reliability calculating step of outputting the reliability of the determination result of said first RF determining step on the basis of the output of said M/N ratio calculating step; and an M/N ratio adaptive repeat field confirming step of confirming the output of said first RF determining step as the determination result on the basis of said reliability outputted from said RF determination reliability calculating step.

20. A repeat field detecting method which is used in a video progressive conversion reproducing apparatus of converting a video input signal of interlace scheme into a video signal of progressive scheme and which detects whether said video input signal is a repeat field where the same video image is outputted repeatedly or an ordinary field which is other than said repeat field, said repeat field detecting method comprising:

a long term M/N ratio calculating step of obtaining an N component which is the number of discrepancy pixels between said repeat fields and an M component which is the number of discrepancy pixels between at least a pair of fields which are other than said repeat fields and have said predetermined distance from each other, on the basis of a discrepancy pixel number which is the number of the pixels having discrepancy between the pixel information of a field of said video input signal and the pixel information of a field of said video input signal having a predetermined distance from the former-mentioned field of the video input signal and on the basis of information of a scene change, and then calculating a long term M/N ratio which is the ratio of said M component to said N component on the time axis of said video input signal ranging from the scene change to the present;

an M/N ratio adaptive scene change detecting step of determining the presence or absence of a scene change in said video input signal on the basis of said discrepancy pixel number and the output of said long term M/N ratio calculating step;

an M/N ratio adaptive composite RF determining step of detecting a repeat field on the basis of said discrepancy pixel number and the output of said M/N ratio adaptive scene change detecting step;

an RF determination reliability calculating step of outputting the reliability of said M/N ratio adaptive composite RF determining step on the basis of the output of said long term M/N ratio calculating step; and an M/N ratio adaptive repeat field confirming step of confirming the output of said first RF determining step as the determination result on the basis of said reliability outputted from said RF determination reliability calculating step; and wherein said information of a scene change is the determination result of said M/N ratio adaptive scene change detecting step.

21. A computer readable medium storing a computer program of causing a computer to serve as:

RF determining means of identifying a repeat field having a predetermined distance from said video input signal, on the basis of a discrepancy pixel number which is the number of the pixels having discrepancy between the pixel information of a field of said video input signal and the pixel information of a field of said video input signal having a predetermined distance from the former-mentioned field of the video input signal;

M/N ratio calculating means of obtaining an N component which is the number of discrepancy pixels between said repeat fields and an M component which is the number of discrepancy pixels between at least a pair of fields which are other than said repeat fields and have said predetermined distance from each other, and then calculating an M/N ratio which is the ratio of said M component to said N component;

RF determination reliability calculating means of outputting the reliability of the determination result of said first RF determining means on the basis of the output of said M/N ratio calculating means; and M/N ratio adaptive repeat field confirming means of confirming the output of said first RF determining means as the determination result on the basis of said reliability outputted from said RF determination reliability calculating means; in a repeat field detecting apparatus according to claim 1.

22. A computer readable medium storing a computer program of causing a computer to serve as:

long term M/N ratio calculating means of obtaining an N component which is the number of discrepancy pixels between said repeat fields and an M component which is the number of discrepancy pixels between at least a pair of fields which are other than said repeat fields and have said predetermined distance from each other, on the basis of a discrepancy pixel number which is the number of the pixels having discrepancy between the pixel information of a field of said video input signal and the pixel information of a field of said video input signal having a predetermined distance from the former-mentioned field of the video input signal and on the basis of information of a scene change, and then calculating a long term M/N ratio which is the ratio of said M component to said N component on the time axis of said video input signal ranging from the scene change to the present;

M/N ratio adaptive scene change detecting means of determining the presence or absence of a scene change in said video input signal on the basis of said discrepancy pixel number and the output of said long term M/N ratio calculating means;

M/N ratio adaptive composite RF determining means of detecting a repeat field on the basis of said discrepancy pixel number and the output of said M/N ratio adaptive scene change detecting means;

RF determination reliability calculating means of outputting the reliability of said M/N ratio adaptive composite RF determining means on the basis of the output of said long term M/N ratio calculating means; and M/N ratio adaptive repeat field confirming means of confirming the output of said first RF determining means as the determination result on the basis of said reliability outputted from said RF determination reliability calculating means; in a repeat field detecting apparatus according to claim 9.

* * * * *

UNITED STATES PATENT AND TRADEMARK OFFICE
CERTIFICATE OF CORRECTION

PATENT NO. : 7,324,157 B2 Page 1 of 1
APPLICATION NO. : 10/506578
DATED : January 29, 2008
INVENTOR(S) : Kuroda et al.

It is certified that error appears in the above-identified patent and that said Letters Patent is hereby corrected as shown below:

In claim 12, at column 31, beginning at line 32, please insert the following text after "threshold value;" --"m-th M/N ratio adaptive RF determination value means of returning the reliability of said"--.

Signed and Sealed this

Thirtieth Day of December, 2008

JON W. DUDAS
*Director of the United States Patent and Trademark Office*